US012705996B2

(12) United States Patent
Baumback et al.

(10) Patent No.: US 12,705,996 B2
(45) Date of Patent: Aug. 11, 2026

(54) RECIPE CONVERSION SYSTEM

(71) Applicant: Hestan Smart Cooking, Inc., Vallejo, CA (US)

(72) Inventors: Mark Baumback, Vallejo, CA (US); Jonathan Jenkins, Vallejo, CA (US)

(73) Assignee: Hestan Smart Cooking, Inc., Vallejo, CA (US)

( * ) Notice: Subject to any disclaimer, the term of this patent is extended or adjusted under 35 U.S.C. 154(b) by 610 days.

(21) Appl. No.: 16/979,614

(22) PCT Filed: Mar. 14, 2019

(86) PCT No.: PCT/US2019/022292

§ 371 (c)(1),
(2) Date: Sep. 10, 2020

(87) PCT Pub. No.: WO2019/178372

PCT Pub. Date: Sep. 19, 2019

(65) Prior Publication Data

US 2021/0043108 A1 Feb. 11, 2021

Related U.S. Application Data

(60) Provisional application No. 62/642,850, filed on Mar. 14, 2018.

(51) Int. Cl.
*G09B 7/02* (2006.01)
*G06F 40/237* (2020.01)
(Continued)

(52) U.S. Cl.
CPC ............. *G09B 7/02* (2013.01); *G06F 40/237* (2020.01); *G06F 40/284* (2020.01); *G06F 40/289* (2020.01); *G09B 7/00* (2013.01)

(58) Field of Classification Search
CPC ....... G06F 40/289; G06F 40/237; G09B 7/00; G09B 7/02
See application file for complete search history.

(56) References Cited

U.S. PATENT DOCUMENTS 5,983,200 A 11/1999 Slotznick
2009/0259688 A1* 10/2009 Do .......................... G06F 3/016
707/E17.096

(Continued)

OTHER PUBLICATIONS

Extended European Search Report dated Nov. 9, 2021, issued in connection with corresponding European Application No. 19768402.0.

(Continued)

*Primary Examiner* — Kesha Frisby
(74) *Attorney, Agent, or Firm* — Blank Rome

(57) ABSTRACT

A system for performing recipe conversion is disclosed. The recipe resulting from the conversion may produce superior and more consistent results for less experienced cooks, particularly when instructions are ported to a cooking system that provides step-by-step guidance with a high level of thermal and time control for critical recipe steps. Further, a converted recipe may optionally include more precise instructions and/or graphic content to assist less experienced cooks. The system analyzes, via natural language processing, an original recipe to identify recipe stages and to determine cooking stages corresponding to the recipe stages. The system correlates the cooking stages to machine instructions, and modifies recipe stages to include enhanced content by using the machine instructions. The system reformats the recipe into a digital file that includes a machine instruction set, which is provided to a device to facilitate the performance of recipe stages when preparing a food item.

20 Claims, 10 Drawing Sheets

(51) Int. Cl.

| | |
|---|---|
| ***G06F 40/284*** | (2020.01) |
| ***G06F 40/289*** | (2020.01) |
| ***G09B 7/00*** | (2006.01) |

(56) References Cited

U.S. PATENT DOCUMENTS

| | | | | |
|---|---|---|---|---|
| 2011/0055044 | A1* | 3/2011 | Wiedl | G06Q 30/0282 705/347 |
| 2012/0136864 | A1* | 5/2012 | Ochtel | G06Q 30/0633 707/738 |
| 2012/0317505 | A1* | 12/2012 | Schwartz | G06Q 30/0633 715/764 |
| 2013/0149679 | A1 | 6/2013 | Tokuda et al. | |
| 2014/0272817 | A1* | 9/2014 | Park | G09B 5/02 434/127 |
| 2016/0286837 | A1* | 10/2016 | Yu | G09B 5/06 |
| 2017/0139385 | A1* | 5/2017 | Young | G05B 19/048 |
| 2017/0323640 | A1 | 11/2017 | Sisodia et al. | |
| 2019/0053332 | A1* | 2/2019 | Cheng | H05B 6/6435 |
| 2019/0130786 | A1* | 5/2019 | Kumbakonam | G09B 5/065 |
| 2022/0013038 | A1* | 1/2022 | LeeKong | G09B 19/0092 |

OTHER PUBLICATIONS

Written Opinion of the International Searching Authority issued in connection with PCT/US2019/022292.

International Search Report issued in connection with PCT/US2019/022292.

* cited by examiner

Figure 4:
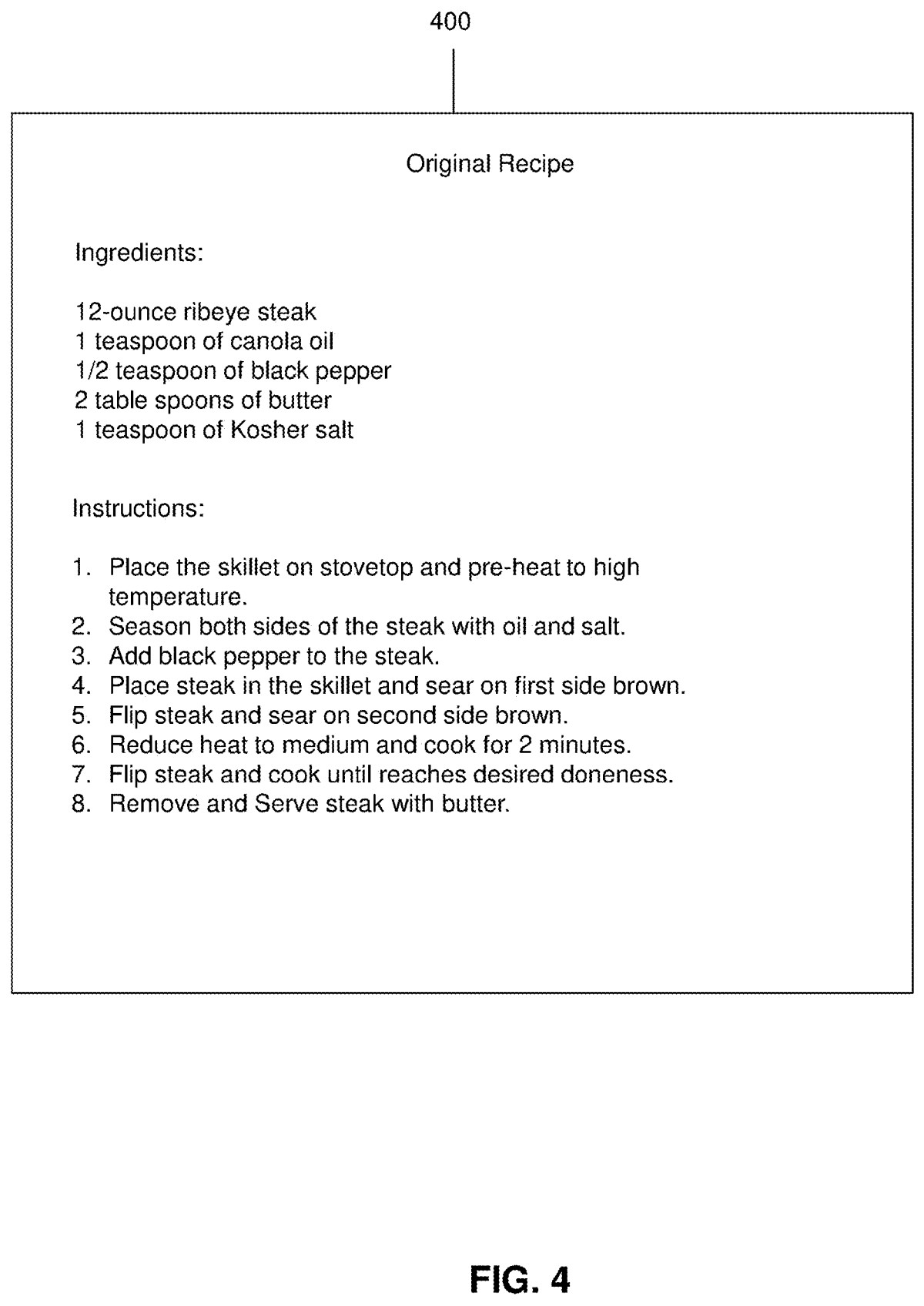

400

Original Recipe

Ingredients:

12-ounce ribeye steak
1 teaspoon of canola oil
1/2 teaspoon of black pepper
2 table spoons of butter
1 teaspoon of Kosher salt Instructions:

1. Place the skillet on stovetop and pre-heat to high temperature.
2. Season both sides of the steak with oil and salt.
3. Add black pepper to the steak.
4. Place steak in the skillet and sear on first side brown.
5. Flip steak and sear on second side brown.
6. Reduce heat to medium and cook for 2 minutes.
7. Flip steak and cook until reaches desired doneness.
8. Remove and Serve steak with butter.

| Verb | Potential Noun | Potential questions | Correlation or added advice |
|---|---|---|---|
| **sear** | steak | Cut of meat, Thickness, desired doneness, number of servings | If known tough cut recommend braising not searing, otherwise insert correlated instruction data and content |
| **braise** | meat | Cut of meat, number of servings | Time and temperature, amount of fluid or stock to use in the pan |
| **poach** | Fish, fillet, cut… | Type of fish, number of servings, thickness of fillet | Time and temperature, amount of liquid to use in the pan |
| **sauté** | mushrooms | Type of mushrooms, number of servings | Time and temperature, amount of oil to use |
| **reduce** | sauce | Number of servings | Time and temperature |
| **broil** | chicken | Number of servings, thickness of meat | Time and temperature |
| **bake** | cookie | Number of servings | Time and temperature |
| **simmer** | soup | Number of servings | Time, temperature and amount of liquid |
| **steam** | broccoli | Number of servings | Time, temperature, and amount of liquid |
| **sweat** | onion | Desired doneness and texture, number of servings | Time, temperature, and amount of oil or butter |
| **brown** | steak | Desired doneness, number of servings | Time and temperature |
| | | | |

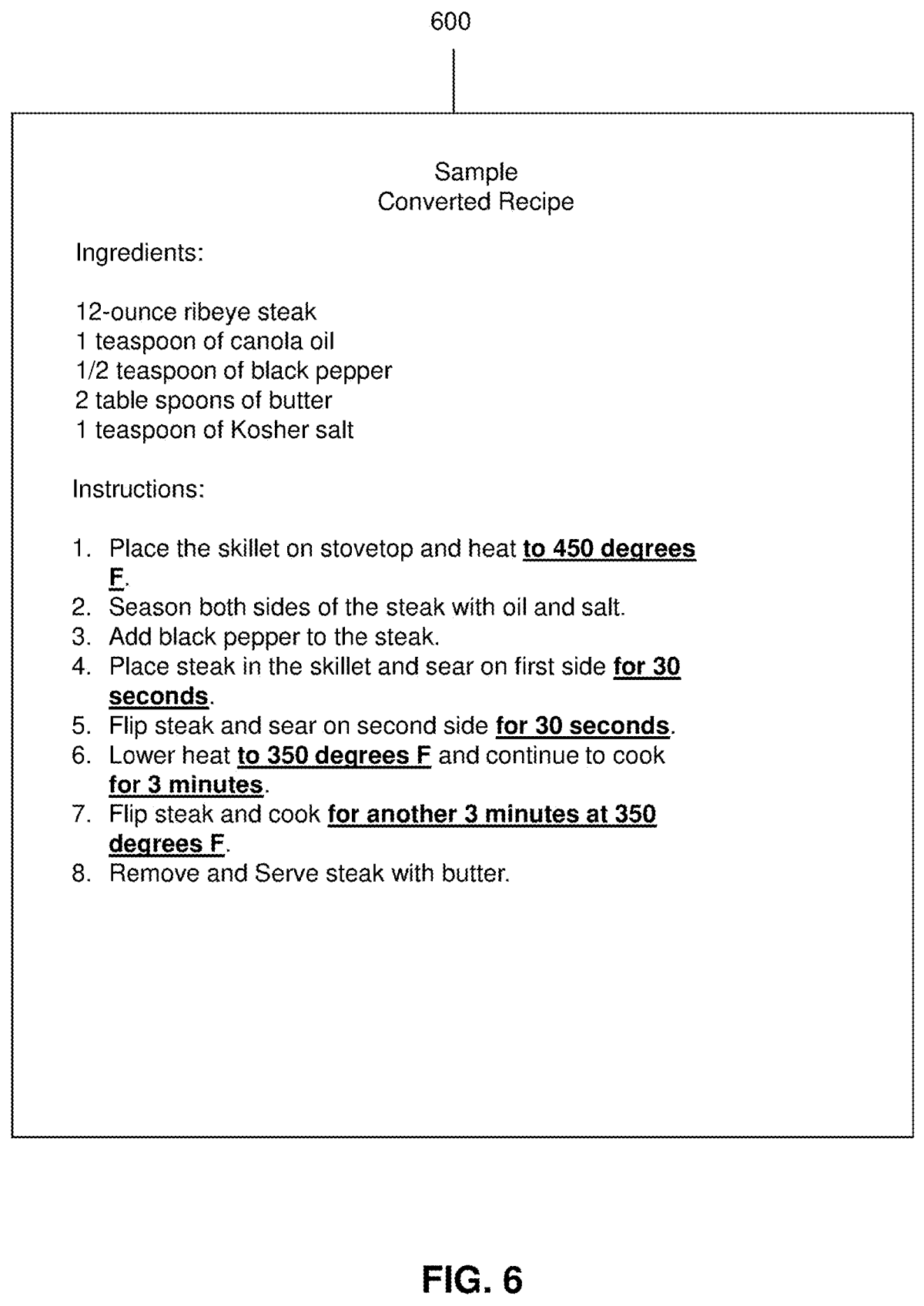

Sample
Converted Recipe

Ingredients:

12-ounce ribeye steak
1 teaspoon of canola oil
1/2 teaspoon of black pepper
2 table spoons of butter
1 teaspoon of Kosher salt Instructions:

1. Place the skillet on stovetop and heat to 450 degrees F.
2. Season both sides of the steak with oil and salt.
3. Add black pepper to the steak.
4. Place steak in the skillet and sear on first side for 30 seconds.
5. Flip steak and sear on second side for 30 seconds.
6. Lower heat to 350 degrees F and continue to cook for 3 minutes.
7. Flip steak and cook for another 3 minutes at 350 degrees F.
8. Remove and Serve steak with butter.

FIG. 6

RECIPE CONVERSION SYSTEM

CROSS-REFERENCE TO RELATED APPLICATIONS

This application is a national phase of PCT/US2019/022292, filed Mar. 14, 2019, and claims priority to U.S. Provisional Application No. 62/642,850, filed Mar. 14, 2018, the entire contents of both of which are hereby incorporated by reference.

FIELD OF THE INVENTION

The present application relates to cooking devices and systems, conversion technologies, natural language processing technologies, computing technologies, machine learning technologies, and more particularly, to a system and method for provide recipe conversion.

BACKGROUND

In today's society, an increasing number of users are seeking to prepare the food they eat at home, instead of going to traditional restaurants or other venues. This increase is based in part on the ever-increasing importance of eating fresh foods that contain ingredients that have not been heavily processed, the desire of individuals to be self-sufficient when it comes to food preparation, the proliferation of higher-quality and energy-efficient cooking devices, and the proliferation of cooking television shows and online digital content that provide step-by-step instructions for preparing various food items. Cooking recipes for preparing food items abound, and can be found in cookbooks, appliance and cookware manufacturers' product literature, as well as in consumer contributions to websites, magazines, and digital versions thereof, in addition to commercial websites for subscription services and free services that generate revenue from advertising. Recent advances in processor, graphical user interface, and network communication technologies for portable computing devices, such as tablets and smartphones, have enabled the creation of a variety of appliances that are controlled by such portable computing devices, including cooking appliances. Application programs deployed and executed on such portable computing devices are typically very appliance-specific.

A user that wishes to follow a recipe not supplied with the application program must ultimately use the cooking appliance in a manual mode, such as by manually adjusting the temperature and time according to the guidance provided in the recipe. On certain occasions, this requires the user to manually convert vague or general descriptions provided in such a recipe to create inputs that the cooking appliance can follow very precisely. On other occasions, users can simply utilize the manual settings of the appliance to prepare the food item using the recipe in a traditional fashion. Notably, however, performing manual conversions into inputs and/or utilizing manual settings of an appliance can be very time consuming and cumbersome for users, particularly for users that are not experienced at cooking. Additionally, traditional recipes are often not provided in consistent formats, may not be user-friendly for many users, may not include proper food safety and handling instructions, and are not readily modifiable to a particular user's tastes.

Based on the foregoing, current food preparation and recipe-related technologies and processes may be modified and improved so as to provide enhanced functionality and features for users. Such enhancements and improvements may effectively decrease the manpower and effort required to prepare various types of food items, while simultaneously increasing adherence to the specific requirements of food recipes and improving food preparation outcomes. Additionally, such enhancements and improvements may provide for optimized food preparation times, increased autonomy, improved interactions between users and the devices that the users utilize in preparing food, improved user satisfaction, increased efficiencies, increased access to meaningful data and content, substantially-improved decision-making abilities, and increased ease-of-use. Furthermore, such enhancements and improvements, particularly considering today's increased emphasis on the benefits of preparing food at home, may foster users in trying new foods and recipes, in increasing their likelihood of cooking at home, and in increasing their enjoyment in preparing food.

SUMMARY

A system and accompanying methods for performing recipe conversion are disclosed. In particular, the system and accompanying methods provide a means for converting ordinary recipes into an automated machine instruction set, which may be utilized by one or more devices to assist in the preparation of a food item. Notably, the system and accompanying methods not only allow for the semi-automated preparation of food items according to a recipe, but also, in certain circumstances, the fully-automated preparation of food items when utilizing the automated machine instruction set. The system and methods also enhance recipes by providing and displaying recipes in a stylistic format that is consistent with the ergonomic principles of graphic design, in which the sequencing between manual and automated cooking steps may be made compatible to a device manufacturer's computing-device application standard (e.g., smartphone application standard). In certain embodiments, the system and methods may also allow a user or even a device to apply their judgement during the recipe conversion process. For example, the system and methods may allow a user to select which steps of a recipe are enhanced and which steps should remain unmodified. The system and methods may also incorporate principles of food safety, such as by ensuring the stringent following of thermal profile requirements that are necessary for foods in order to minimize a user's exposure to infectious agents. In certain embodiments, the system and methods may enhance and improve existing recipes by incorporating enhanced content to the recipes. Such content may include, but is not limited to, photographical images, audio content, web content, instructional videos, and more detailed recipe instructions with regard to the ingredients used in the recipe, as well as with regard to preparation and cooking methods utilized for preparing the food item. In certain embodiments, the system and methods may also improve the outcomes of recipes by incorporating content into recipes that clarifies originally vague descriptions of the ingredients, quantities, cooking methods, and/or cooking times to the extent that they are known to affect the outcome of the cooking process and the texture and flavor profile of the food item being prepared.

In order to accomplish the foregoing, the system and methods may utilize one or more natural language processing techniques to analyze an original recipe, such as a scanned digital copy of a printed recipe. For example, a natural language processing engine may access and analyze a digital version of a recipe, such as from text obtainable on the internet at a selected uniform resource locator (URL). The natural language processing of the recipe may be utilized to identify the text to which analysis rules are to be applied. In particular, the analysis conducted by the natural language processing engine may be utilized in conjunction with rules to convert the original recipe to an automated machine instruction set, such as for use by a cooking appliance. The converted recipe and/or the machine instruction set supporting the converted recipe may be displayed on a graphical user interface of a device of a user, such as on a smartphone or tablet. In certain embodiments, the converted recipe may be accessible and/or executed via an interactive electronic cookbook executing on a user's device. The interactive electronic cookbook may provide users and automated cooking appliances with access to recipes from not only traditional printed formats, but also from digital text files of recipes.

In certain embodiments, the system and methods may include utilizing analysis rules that consider the context of the food item being prepared and/or cooked, best practices as appropriate for a particular device being utilized for food preparation and/or cooking, and the specificity of the recipe being converted with regard to relative heating power and/or observable changes in the color and texture of food during preparation and/or cooking. To the extent a particular recipe provides higher-precision guidance with respect to how long a cooking step should take to achieve a desired result, the application of the analysis rules by the system and methods enables a more accurate determination of the optimal cooking time and temperature profile for the food item and/or ingredients utilized in preparing the food item. On occasions where a particular recipe provides lower-precision guidance, the application by the system and methods of the analysis rules may result in presenting a user with a series of questions to answer, which depending on the answers to the questions, will cause the system and methods to generate superior guidance in cooking that is precise with regard to time, temperature, and manipulation of the ingredients during cooking. This may be particularly useful in contexts where the original creator of the original recipe utilized a specific type of cut or source of protein than what the user preparing the food item has available in his kitchen.

In certain embodiments, if a particular recipe step or stage does not require the use of heat or cooling to transform ingredients, conversion of the original recipe text may not be performed. However, in certain embodiments, even if a recipe step or stage does not use heat or cooling to transform ingredients, there may be occasions where it will still be desirable to provide more precise and helpful food preparation instructions. For example, such steps or stages may be modified to make them more precise, improve the quality of the food item created based on the recipe, and/or increase food and personal safety. For example, although the chopping of ingredients is not a step that utilizes heat or cooling to transform the ingredients, achieving the proper and uniform size of the ingredients may affect the end result of the cooking process because heat from a cooking pan or medium that surrounds the food will more quickly transfer to smaller and uniform pieces of food when compared to larger and non-uniform pieces of food. Based on the functionality and features provided by the system and methods, the system and methods may be utilized to optimize food preparation times, increase autonomy, improve interactions between users and the devices that the users utilize in preparing food, improve user satisfaction, increase efficiencies, increase access to meaningful data and content, substantially-improved decision-making abilities, and increase ease-of-use for users.

To that end, in one embodiment according to the present disclosure, a system for performing recipe conversion is disclosed. The system may include a memory that stores instructions and a processor that executes the instructions to perform operations conducted by the system. The system may perform an operation that includes obtaining a digital recipe for preparing a food item that includes digital content. For example, the digital recipe may be a recipe for preparing steak that has been digitally scanned by a user or device. Once the digital recipe including the digital content is obtained, the system may perform an operation that includes parsing, such as by utilizing a natural language processing engine, the digital content for keywords to identify at least one recipe stage of the digital recipe. The system may proceed to perform an operation that includes identifying each recipe stage of the at least one recipe stage that corresponds to a cooking stage. For example, if a recipe stage indicates that a steak is to be seared during a particular recipe stage, the system may determine that the particular recipe stage corresponds to a cooking stage. In certain embodiments, the system may proceed to identify one or more key ingredients in each recipe stage corresponding to a cooking stage. Key ingredients may be ingredients that may have a critical effect on a cooking time for a particular cooking stage. The system may then proceed to determine that at least one recipe stage corresponding to a cooking stage correlates to an existing machine instruction stored in the memory of the system. In certain embodiments, the determining of the correlation may be facilitated based on the determination and identification of the key ingredient. By utilizing the existing machine instruction, the system may perform an operation that includes substituting the one or more of the recipe stages corresponding to cooking stages that correlate with the machine instruction with enhanced content so as to enhance the digital recipe. The system may then proceed to perform an operation that includes reformatting the digital recipe into a digital file including a machine instruction set, which may be provided to a device, such as a cooking device, to facilitate performance of the recipe stages to assist in preparation of the food item.

In another embodiment, a method for performing recipe conversion is disclosed. The method may include utilizing a memory that stores instructions, and a processor that executes the instructions to perform the various functions of the method. In particular, the method may include obtaining a digital recipe including digital content. For example, the digital content may be textual instructions that describe the various recipe stages or steps that a user need to perform in order to prepare a food item. The method may then include analyzing, such as by utilizing a natural language processing engine, the digital content for keywords to identify one or more recipe stages of the digital recipe. The method may then include identifying each recipe stage of the one or more recipe stages that corresponds to a cooking stage. The method may then include determining, such as by utilizing the natural language processing engine, that one or more recipe stages that correspond to a cooking stage correlate to an existing machine instruction stored in the memory. By utilizing the existing machine instruction, the method may include modifying the one or more recipe stages corresponding to the cooking stage that correlates to the existing machine instruction with enhanced content so as to enhance the digital recipe. The method may then include reformatting the digital recipe into a digital file including a machine instruction set for enabling a device to facilitate performance of the one or more recipe stages so as to assist in the preparation of the food item.

According to yet another embodiment, a computer-readable device having instructions for performing recipe conversion is provided. The computer instructions, which when loaded and executed by a processor, may cause the processor to perform operations including: receiving a digital recipe including digital content; analyzing, by utilizing a natural language processing engine, the digital content for keywords to identify at least one recipe stage of the digital recipe; identifying each recipe stage of the at least one recipe stage that corresponds to a cooking stage; identifying a key ingredient in each recipe stage that corresponds to the cooking stage, wherein the key ingredient is an ingredient having a critical effect on a cooking time for the cooking stage; determining, by utilizing the natural language processing engine and based on the identification of the key ingredient, that at least one recipe stage that corresponds to the cooking stage correlates to an existing machine instruction; enhancing, based on the existing machine instruction, the at least one recipe stage corresponding to the cooking stage that correlates to the existing machine instruction with enhanced content; and reformatting the digital recipe into a digital file including a machine instruction set for enabling a device to facilitate performance of the at least one recipe stage.

These and other features of the systems and methods for performing recipe conversion are described in the following detailed description, drawings, and appended claims.

BRIEF DESCRIPTION OF THE DRAWINGS

FIG. 4 is a schematic diagram illustrating a sample original recipe inputted into and/or accessed by the system of FIGS. 1-3.

FIG. 5 is a table illustrating content parsed from one or more recipes, potential questions that the system of FIGS. 1-3 may pose to a user, and time, temperature, and other information correlated to the parsed content.

FIG. 6 is a schematic diagram illustrating the sample original recipe of FIG. 4 converted into an enhanced recipe by the system of FIGS. 1-3.

DETAILED DESCRIPTION OF THE INVENTION

Figure 1:
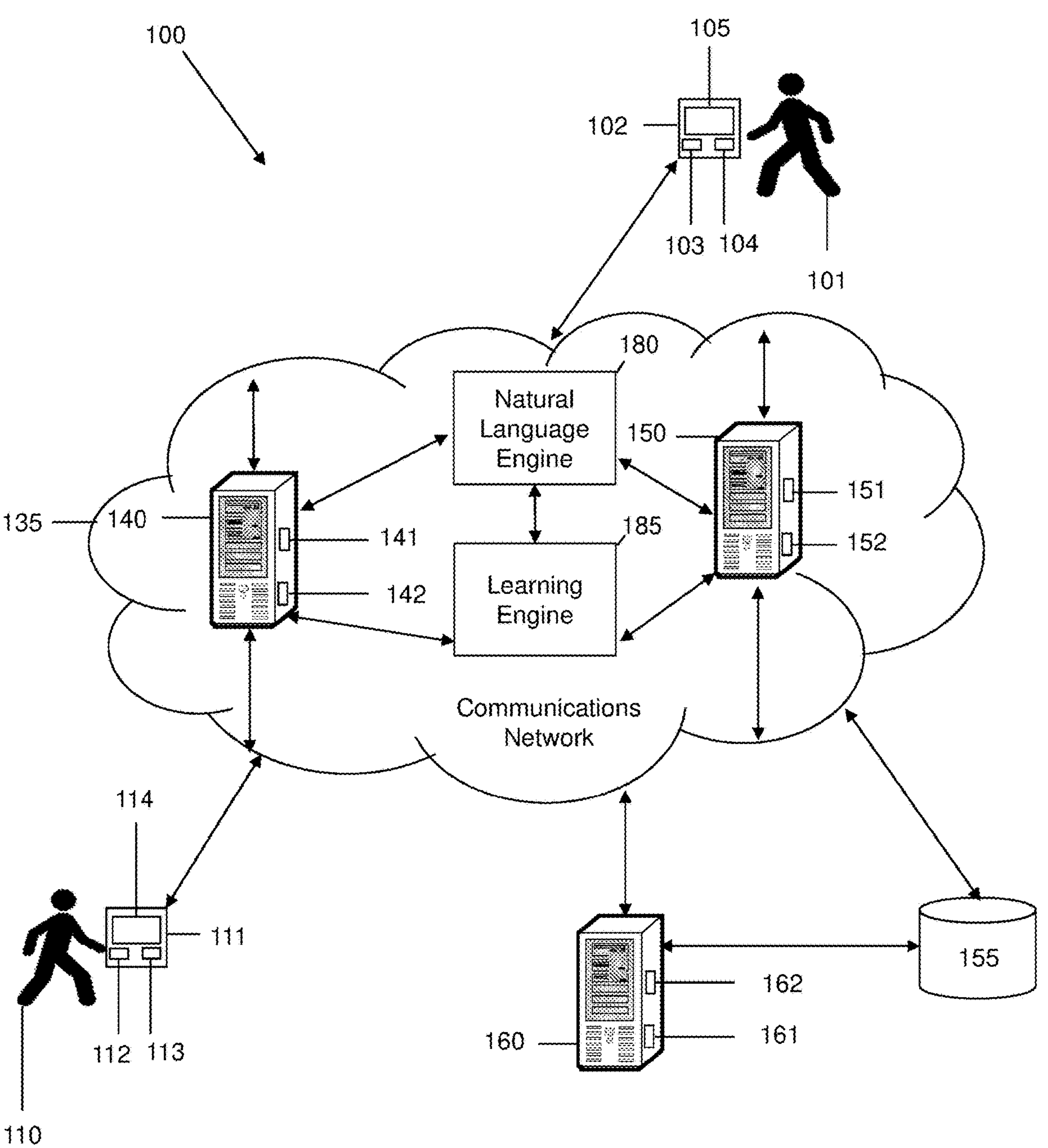
FIG. 1 is a schematic diagram of a system for performing recipe conversion according to an embodiment of the present disclosure.

A system 100 and accompanying methods (e.g., method 900) for performing recipe conversion are disclosed. In particular, the system 100 and accompanying methods provide a means for converting traditional recipes into an automated machine instruction set, which may be utilized by one or more devices (e.g., cooking device 170) to assist in the preparation of a food item 130. Notably, the system 100 and accompanying methods allow for both the semi-automated preparation of the food item 130 according to a recipe, but also, the fully-automated preparation of the food item 130. The system 100 and methods also enhance traditional recipes by providing and displaying recipes in a stylistic format that is consistent with ergonomic principles of graphic design, in which the sequencing between manual and automated cooking steps may be made compatible to a device manufacturer's computing-device application standard. In certain embodiments, the system 100 and methods may also allow a user (e.g., first or second users 101, 110) or even a device (e.g., first and/or second user devices 102, 111) to apply their judgement during the recipe conversion process. For example, the system 100 and methods may allow a user to select which steps of a recipe are enhanced and which steps should not be enhanced.

The system 100 and methods may also incorporate principles of food safety, such as by ensuring the stringent following of thermal profile requirements that are necessary for foods in order to minimize a user's exposure to infectious agents. For example, a machine instruction set generated by the system 100 and methods may specify that a burner of a heat source 121 should remain at a set temperature for a set duration of time so that a steak being cooked by the cooking device 170 has a core temperature known to kill pathogenic bacteria. In certain embodiments, the system 100 and methods may enhance and improve existing recipes by incorporating enhanced content to the recipes including, but not limited to, image content, audio content, virtual reality content, augmented reality content, web content, instructional videos, and more detailed recipe instructions with regard to the ingredients used in the recipe and with regard to the preparation and cooking methods utilized for preparing the food item 130. In certain embodiments, the system 100 and methods may also improve the outcomes of recipes by incorporating content into recipes that clarifies originally vague descriptions of the ingredients, quantities, cooking methods, and/or cooking times to the extent that they are known to affect the outcome of the cooking process and the texture and flavor profile of the food item 130 being prepared.

In accomplishing the foregoing, the system 100 and methods may utilize one or more natural language processing techniques to analyze an original recipe, such as a scanned digital copy of a printed recipe. For example, a natural language processing engine 180 may access and analyze a digital version of a recipe, such as from text obtainable on the internet at a selected uniform resource locator (URL) or from a scanned recipe inputted into an application supporting the functionality of the system 100. The natural language processing of the recipe performed by the natural language processing engine 180 may be utilized to identify the text to which analysis rules are to be applied. In particular, the analysis conducted by the natural language processing engine 180 may be utilized in conjunction with the rules to convert an original recipe to an automated machine instruction set, such as for use by cooking device system 168, cooking device 170, heating system 120, a software application of the system 100, any other device or system, or a combination thereof. The converted recipe and/or the machine instruction set supporting the converted recipe may be displayed on a graphical user interface (e.g., interface 105) of a device (e.g., first user device 102) of a user, such as on a smartphone or tablet. In certain embodiments, the converted recipe may be accessible and/or executed via an interactive electronic cookbook 106 executing on the user's device. The interactive electronic cookbook 106 may provide users and automated cooking appliances with access to recipes from not only traditional printed formats, but also from digital text files of recipes.

The system 100 and methods may include utilizing analysis rules that consider the context of the food item 130 being prepared and/or cooked, best practices as appropriate for a particular device (e.g., cooking device 170) being utilized for food preparation and/or cooking, and the specificity of the recipe being converted with regard to relative heating power and/or observable changes in the color and texture of food during preparation and/or cooking. To the extent a particular recipe provides higher-precision guidance with respect to how long a cooking step should take to achieve a desired result, the application of the analysis rules by the system 100 and methods enable a more accurate determination of the optimal cooking time and temperature profile for food item 130 and/or ingredients utilized in preparing the food item 130. On occasions where a particular recipe provides lower-precision guidance, the application by the system 100 and methods of the analysis rules may result in presenting a user with a set of questions to answer. Based on the answers to the questions, the system 100 and methods may generate superior guidance in cooking that is precise with regard to time, temperature, and manipulation of the ingredients during cooking. For example, higher quality and more precise cooking instructions (e.g., cooking instructions 124) may be generated by utilizing the functionality provided by the system 100 and methods.

In certain embodiments, if a particular recipe step or stage does not require the use of heat or cooling to transform ingredients, conversion of the original recipe text may not be performed. In certain embodiments, however, even if a recipe step or stage does not use heat or cooling to transform ingredients, there may be occasions where it may be desirable to provide more precise and helpful food preparation instructions. For example, such steps or stages may be modified to make them more precise, improve the quality of the food item 130 created based on the recipe, and/or increase food and personal safety. For example, although the chopping or dicing of ingredients is not a step that utilizes heat or cooling to transform the ingredients, achieving the proper and uniform size of the ingredients may affect the end result of the cooking process because heat from a cooking pan or medium that surrounds the ingredients will more quickly transfer to smaller and uniform pieces of food when compared to larger and non-uniform pieces of food. Based on the functionality and features provided by the system 100 and methods, the system 100 and methods may be utilized to optimize food preparation times, increase autonomy, improve interactions between users and the devices that the users utilize in preparing food, improve user satisfaction, increase efficiencies, increase access to meaningful data and content, substantially-improved decision-making abilities, and increase ease-of-use for users while cooking various food items 130.

As shown in FIGS. 1-10, a system 100 and method 900 for performing recipe conversion are disclosed. The system 100 may be configured to support, but is not limited to supporting, food preparation and cooking applications and services, machine learning services, artificial intelligence services, data and content services, computing applications and services, cloud computing services, internet services, satellite services, telephone services, software as a service (SaaS) applications and services, mobile applications and services, and any other computing applications and services. The system may include a first user 101, who may utilize a first user device 102 to access data, content, and applications, or to perform a variety of other tasks and functions. As an example, the first user 101 may utilize first user device 102 to access an application (e.g., a browser or a mobile application) executing on the first user device 102 that may be utilized to access web pages, data, and content associated with the system 100. In certain embodiments, the first user 101 may be any type of user that may potentially desire to cook a particular food item 130, prepare a food item 130, try out a recipe for making a food item 130, or any combination thereof. For example, the first user 101 may access a software application (e.g., interactive electronic cookbook 106) that has functional features to allow for the display of digital recipes, the selection of recipes, the searching of recipes, the retrieval of instructional recipe videos, any other cooking and/or food-related features, any other features, or any combination thereof.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g., screen, monitor, graphical user interface, etc.) that may enable the first user 101 to interact with various applications executing on the first user device 102, to interact with various applications executing within the system 100, and to interact with the system 100 itself. In certain embodiments, the first user device 102 may include an interactive electronic cookbook 106, which may be a software application executing on the first user device 102, accessible by the first user device 102, or a combination thereof. The software application supporting the interactive electronic cookbook 106 may include a set of instructions, logic, or code embodied in a computer-readable storage medium and configured to facilitate the operation of first user device 102 with regard to cooking and/or the interactive electronic cookbook 106. The interactive electronic cookbook 106 may provide the first user 101 with instructions and other content associated with preparing and cooking a food item 130. For example, the interactive electronic cookbook 106 may provide the first user 101 with one or more cooking recipes and additional content that may assist the first user 101 in preparing and cooking a food item 130.

In certain embodiments, the interactive electronic cookbook 106 may be in communication with a heating system 120, which is described in further detail below. The interactive electronic cookbook 106 and the heating system 120 may communicatively link via a suitable communications means, such as via Bluetooth and/or any other communications technology described herein. The communication link may be a two-way communication link, such that both the interactive electronic cookbook 106 and the heating system 120 (and/or the cooking device system 168 described later in this disclosure) may send signals to each other, and receive signals from each other. Additionally, as described herein, the interactive electronic cookbook 106, the first user device 102, the second user device 111 (described later in this disclosure), and the heating system 120 may utilize any other communication technologies. In certain embodiments, the interactive electronic cookbook 106 may communicate with the heating system 120 to execute one or more recipe stages or steps utilized to bring the cooking device 170 and/or a cooking environment associated with the food item 130 to a desired temperature as specified by a cooking recipe and for a duration of time specified by the cooking recipe. Time and/or temperature control provided by the operation of the interactive electronic cookbook 106 may be used to reduce errors that may otherwise occur when setting the amount of energy provided by the heat source 121. In certain embodiments, the interactive electronic cookbook 106 may be in communication with one or both of the heating system 120 and the cooking device system 168 to cause the control of the food environment at the precise temperature set forth in the cooking recipe by measurements of temperature and modulation or adjustment of the energy provided by the heat source 121 of the heating system 120 to maintain the food environment at precisely the desired temperature.

Also, in certain embodiments, the interactive electronic cookbook 106 may be in communication with the cooking device system 168. The interactive electronic cookbook 106 and cooking device system 168 may communicatively link via a suitable communications means, such as via Bluetooth and/or any other communications technology described herein. In certain embodiments, the interactive electronic cookbook 106 and the cooking device system 168 may utilize other communication technologies and/or protocols. The communication between the interactive electronic cookbook 106 and the cooking device system 168 may allow the interactive electronic cookbook 106 to check and confirm any information associated with the cooking device system 168, such as, but not limited to, power levels of the cooking device 170, sensor outputs from the sensors **175*a-d* (described later in this disclosure), any other information, or any combination thereof. In certain embodiments, the cooking device system 168 may communicatively advertise device or environmental information such as a device identifier and temperature, which may be used by the interactive electronic cookbook 106**.

In certain embodiments, the interactive electronic cookbook 106 may allow users (e.g., first user 101) to obtain professional results that would not normally be readily possible because the precise control of temperature and timing afforded by the electronic control of the heating system 120 may provide reproducible results without requiring the use of a professional chefs expertise in judging food doneness from a combination of the feel, texture, and color of the food during the cooking process. The interactive electronic cookbook 106 may provide expert guidance with regard to the preparation of ingredients before cooking to assist the first user 101 in achieving optimal results. For example, the interactive electronic cookbook 106 may provide expert guidance in one or more food preparation steps required prior to cooking or one or more finishing steps after cooking to assist the first user 101 in achieving optimal results. In certain embodiments, the interactive electronic cookbook 106 may provide additional content that may be used to increase the first user's 101 skill level and judgment of ingredients being at a stage (or step) to start another stage (or step) in a cooking recipe, such as from a combination of the feel, texture and color of the food during the cooking process. This guidance provided by the interactive electronic cookbook 106 may be available at various stages or at each stage in the cooking recipe and may include the display of a picture and/or video of techniques such as cutting, dicing, filleting, mixing, or stirring techniques. A graphical user interface of the interactive electronic cookbook 106 may also include images and/or video of a desired appearance of a food item 130 after the successful completion of a recipe stage of the recipe.

The interactive electronic cookbook 106 may utilize the interface 105 of the first user device 102 or a virtual reality or augmented reality display device in use by the first user 101 to allow the first user 101 to easily view, receive, or play the recipe instructions. Display aspects of the interactive electronic cookbook 106, for example, may be utilized to better illustrate complicated preparation techniques when compared to traditional purely text-based recipes. In certain embodiments, the interactive electronic cookbook 106 may include reminders that notify the first user 101 of the proper or safe ways to use cookware or utensils. The interactive electronic cookbook 106 may also be configured to avoid mistakes or oversights by deploying check lists, reminders, and/or timers. Such features may be optional and selectable by the user. Display features may provide the first user 101 with information from which to decide whether to attempt a recipe. For example, the first user 101 may skip forward through the steps of a recipe to view complicated or time consuming steps before attempting them. In certain embodiments, the interactive electronic cookbook 106 may include a search function allowing the first user 101 to search for specific foods, steps, types of heat sources, recipes of varying degrees of difficulty, dietary nutrients, calories per serving for food items 130, preparation times, cook times, costs, or other search criteria to assist users with finding food items 130 appropriate for their diets.

In certain embodiments, the interactive electronic cookbook 106 may display text of the steps of a recipe in proximity with a video demonstration of the step. Additionally, audio content corresponding to the text may be played and/or audio content corresponding to the video demonstration may be played as well. For example, a traditional recipe may initially list the ingredients and equipment, and at times the preparation and cooking time. The interactive electronic cookbook 106 may be configured to present any combination of images and video content, which could be a still shot or a pan shot showing the ingredients and/or what the finished food item 130 looks like with nutritional information and preparation time in the text portion. The recipe of the interactive electronic cookbook 106 may then illustrate how to prepare the ingredients, such as for example by showing how to chop, slice, dice, mix, perform any other culinary technique, or any combination thereof. The next steps may be presented in the order of cooking and then the final presentation of the cooked food item 130. In certain embodiments, when a recipe includes complex steps, such as novel preparation techniques, the first user 101 may interface and/or consult with the interactive electronic cookbook 106 to visually verify that the food item 130 the user has prepared has the proper appearance, texture, or color at one or more stages of the recipe. As a result, before navigating to the next step in the recipe, the first user 101 may navigate through images or other content, such as text, to verify satisfactory completion of the step or stage of the recipe. The interactive electronic cookbook 106 may also use image recognition algorithms on images of the cooking process taken by one or more cameras that are part of the first user device 102 (or any other device in communication range of the wireless device) in order to provide feedback to the user on proper appearance, texture, color or doneness of the food. Notably, the interactive electronic cookbook 106 may include any number of recipes and new recipes that may be downloaded to the interactive electronic cookbook 106, such as from the internet and/or from another device communicatively linked to the first user device 102. In certain embodiments, the interactive electronic cookbook 106 may allow the first user 101 to delete and/or modify recipes from the interactive electronic cookbook 106, such as via one or more options presented on a graphical user interface of the interactive electronic cookbook 106.

In certain embodiments, the first user device 102 may also include a network interface 107. The network interface 107 may be any suitable device or component operable to receive information from communications network 135 and/or subnetworks 135*a-c,* transmit information through communications network 135 and/or subnetworks 135*a-c,* perform processing of information, communicate to other devices, or any combination thereof. For example, network interface 107 may receive measurement information 125 (such as a current temperature associated with the cooking of a food item 130) from the cooking device system 168. As another example, network interface 107 may be utilized to transmit cooking instructions 124 to the heating system 120. Network interface 107 may include any port or connection, real or virtual, including any suitable hardware and/or software, including protocol conversion and data processing capabilities, to communicate through a local area network (LAN), a metropolitan area network (MAN), a wide area network (WAN), or other communication system that allows first user device 102 to exchange information with communications network 135, subnetworks 135*a-c,* heating system 120, cooking device system 168, and/or other components of system 100. In certain embodiments, the first user device 102 may be a computer, a laptop, a tablet device, a phablet, a server, a mobile device, a smartphone, a smart watch, and/or any other type of computing device. The first user device 102 may also be equipped with transceivers, short-range wireless circuitry (e.g., Bluetooth, etc.), and/or other suitable communications equipment to facilitate communications between the first user device 102 and/or any other device, program, and/or system of the system 100. Illustratively, the first user device 102 is shown as a tablet device in FIGS. 1-2. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As with the first user 101, in certain embodiments, the second user 110 may be any type of user that may potentially desire to cook a particular food item 130, prepare a food item 130, try out a recipe for making a food item 130, or any combination thereof. For example, the first user 101 may access a software application that includes functional features that allow for the display of digital recipes, the selection of recipes, the searching of recipes, the retrieval of instructional recipe videos, any other cooking and/or food-related features, any other features, or any combination thereof. Much like the first user 101, the second user 110 may utilize second user device 111 to access an application (e.g., a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g., a screen, a monitor, a graphical user interface, etc.) that may enable the second user 110 to interact with various applications executing on the second user device 111, to interact with various applications executing in the system 100, and to interact with the system 100. The second user device 111 may also be equipped with transceivers, short-range wireless circuitry (e.g., Bluetooth, etc.), and/or other suitable communications equipment to facilitate communications between the second user device 111 and/or any other device, program, and/or system of the system 100. In certain embodiments, the interactive electronic cookbook 106 may be configured to execute on the second user device 111 as well. In certain embodiments, the second user device 111 may be a computer, a laptop, a tablet device, a phablet, a server, a mobile device, a smartphone, a smart watch, and/or any other type of computing device. Illustratively, the second user device 111 may be a mobile device in FIG. 1. The second user device 111 may also include any of the componentry described for first user device 102.

In certain embodiments, the first user device 102, the second user device 111, and/or other devices of the system 100 may have any number of software applications and/or application services stored and/or accessible thereon. For example, the first and second user devices 102, 111 may include food preparation applications (e.g., interactive electronic cookbook 106), cooking applications (e.g., interactive electronic cookbook 106), recipe applications (e.g., interactive electronic cookbook 106), artificial intelligence-based applications, machine learning-based applications, applications for facilitating the completion of tasks, cloud-based applications, search engine applications, natural language processing applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or any combination thereof. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111.

In certain embodiments, the software application(s) (e.g., interactive electronic cookbook 106) may be configured to perform and support any number of operative functions of the system 100. In certain embodiments, the application may be a software program, a website, a mobile application, a software application, a software process, or a combination thereof, which may be made accessible to users (e.g., first and second users 101, 110) utilizing one or more computing devices, such as first user device 102 and second user device 111. The software application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom graphical user interface that the first user 101 or second user 110 may interact with, such as by utilizing a web browser or other program executing on the first user device 102 or second user device 111. In certain embodiments, the software application may execute directly as an installed program on the first and/or second user devices 102, 111, such as a mobile application or a desktop application. In certain embodiments, the software application may execute directly on any combination of the servers 140, 150, 160.

In certain embodiments, the software application may include multiple programs and/or functions that execute within the software application and/or are accessible by the software application. For example, the software application may include an application that generates web content and pages that may be accessible to the first and/or second user devices 102, 111, any type of program, or any combination thereof. The application that generates web content and pages may be configured to generate a user interface for the software application that is accessible and viewable by the first and second users 101, 110 when the software application is loaded and executed on the first and/or second computing devices 102, 111. The user interface for the software application may display content for viewing by the first and/or second users 101, 110 via the first and/or second user devices 102, 111. For example, the content displayed via the user interface may be one or more recipes and media content associated with the recipes. Additionally, the user interface of the software application may display functionality provided by the software application that enables the first and second users 101,110 and/or the first and second computing devices 102, 111 to interact with the software application and any modules supporting the software application's functionality. In certain embodiments, the software application may be configured to include any program or process in the system 100. The user interface of the application may have both visual and auditory elements as output, and may be configured to receive keyboard inputs, mouse inputs, microphone inputs, any type of inputs, or any combination thereof, from a user and/or device interacting with the user interface. In certain embodiments, the user interface may be adapted to receive inputs via user interface elements specifically configured for people with disabilities or challenging circumstances. In certain embodiments, an application programming interface (API) or software development kit (SDK) may be utilized for remote computers to connect with the system 100, and may input or output information as needed.

Figure 2:
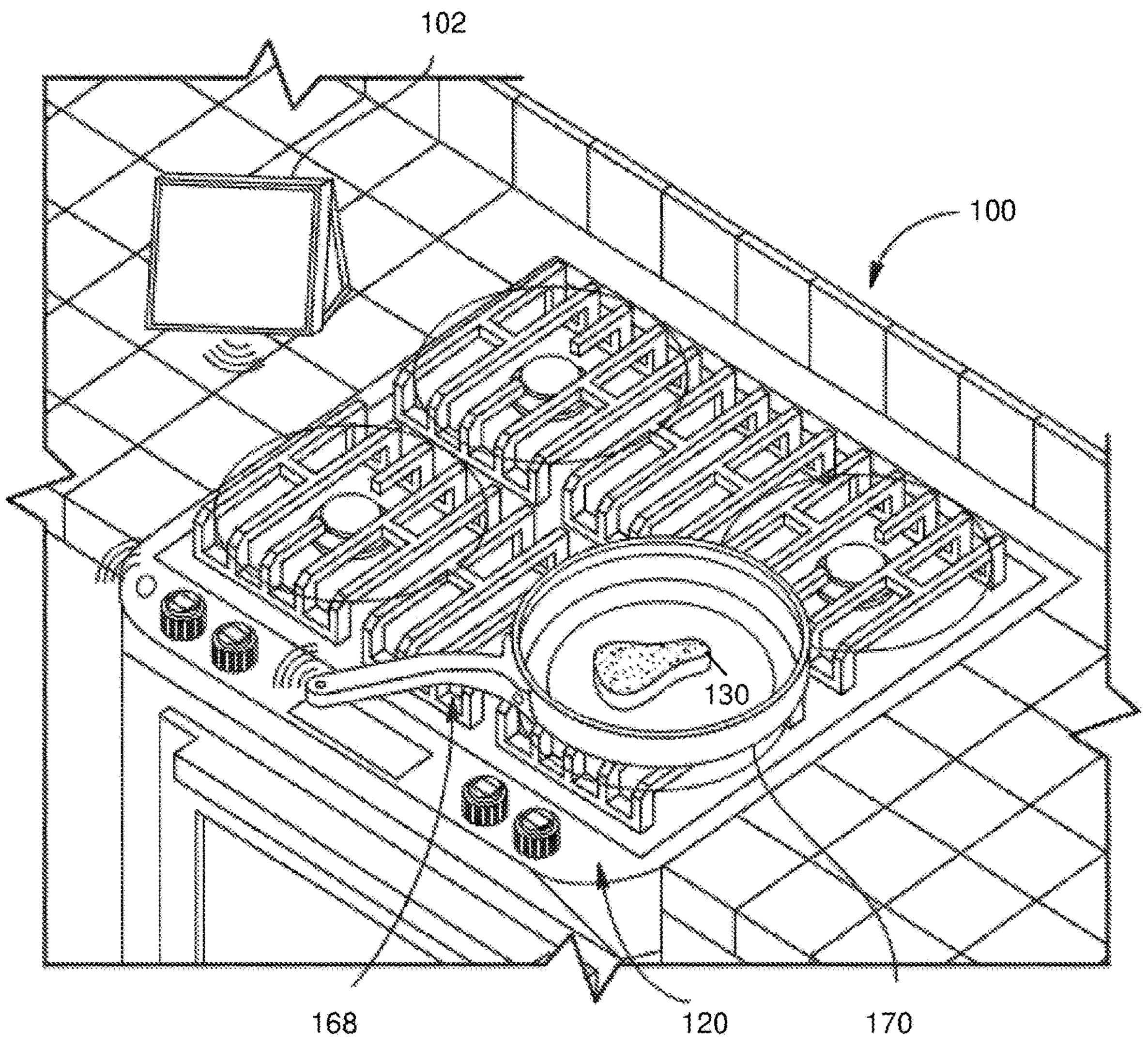
FIG. 2 is a schematic diagram illustrating various components of the system of FIGS. 1-3, which facilitate the functional operation of the system and which facilitate the preparation of a food item according to one or more recipes.
Figure 3:
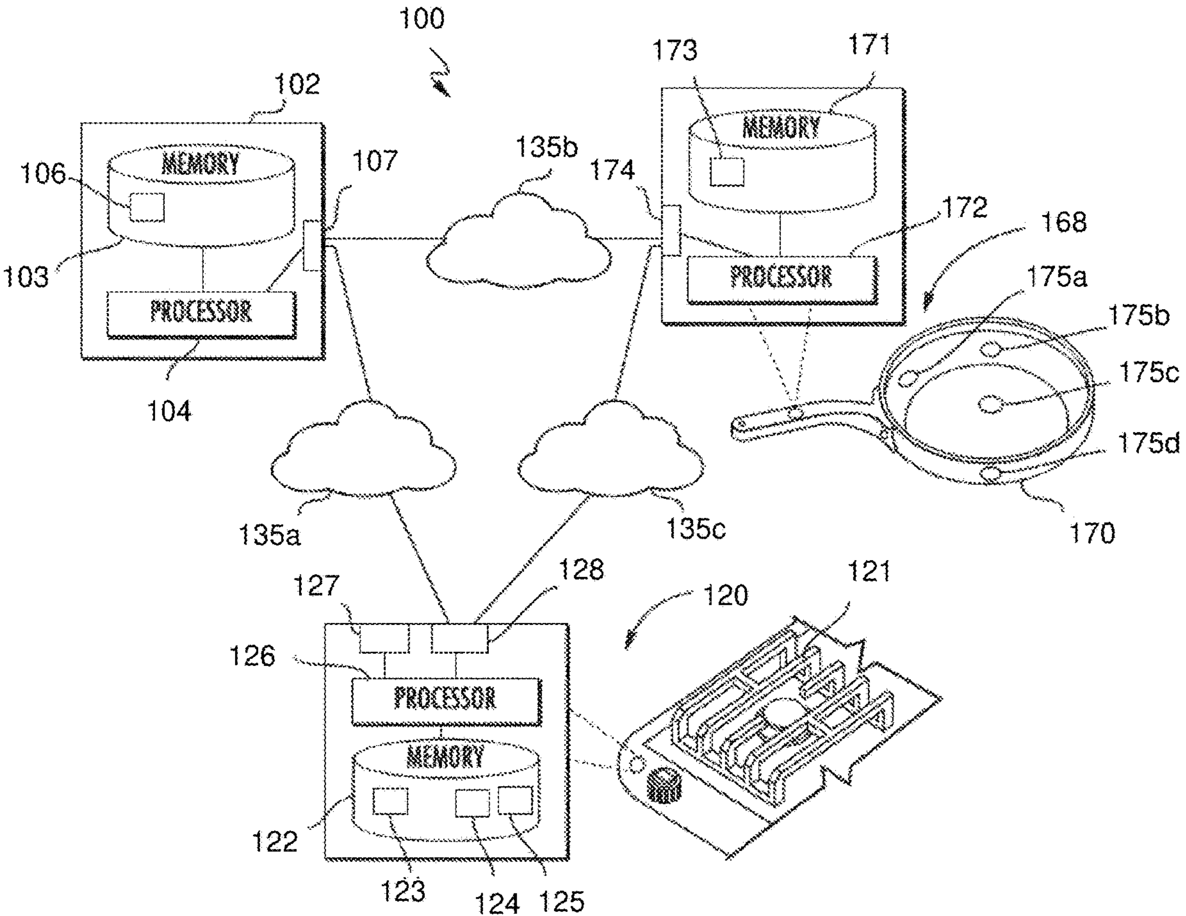
FIG. 3 is a schematic diagram illustrating further details relating to various components of the system of FIGS. 1-3, which facilitate the functional operation of the system and which facilitate the preparation of a food item according to one or more recipes.

In addition to the first and second user devices 102, 110, the system 100 may also include a heating system 120. The heating system 120 may include any suitable components that can provide an amount of energy to cook a food item 130, and which can communicate with the first and/or second user devices 102, 111 to assist the first and/or second users 101, 111 respectively with cooking food items 130. Additionally, in certain embodiments, the heating system 120 may also communicate with the cooking device system 168 to assist the first and/or second user 101, 110 with cooking food items 13. Illustratively, the heating system 120 includes a heat source 121, a network interface 128, a user interface system 127, a processor 126, and a memory 122. The heat source 121 of the heating system 120 may be any device that may provide an amount of energy to cook a food item 130. For example, the heat source 121 may be a burner (such as an induction burner, gas burner, infrared burner, and/or heating coil), a resistive heating element, a heat lamp (such as a Halogen lamp), an oven, a microwave, a stove top, a range, a grill, any other device that may provide an amount of energy to cook a food item, or any combination thereof. In FIGS. 2-3, the heat source 121 is a gas burner that provides heat energy in the form of a gas flame. Notably, the heating system 120 may include any number of heat sources 121 and is not limited to the amount of heat sources 121 depicted in FIGS. 2-3.

In certain embodiments, the heat source 121 may be connected to a power source that provides power (or energy) to the heat source 121, which allows the heat source 121 to provide an amount of energy to cook a food item 130. The power source may be any type of power source, such as an electrical power source (e.g., a battery or a connection to an electrical outlet), a gas power source (e.g., a gas canister or a connection to a gas line), any other source of power (or energy), or any combination thereof. As is discussed above, the heating system 120 further includes network interface 128, user interface system 127, processor 126, and memory 122. The network interface 128, user interface system 127, processor 126, and memory 122 may be positioned at any location on, in, or adjacent the heating system 120 so as to allow the network interface 128 and processor 126 to communicate with the heat source(s) 121 of the heating system 120 and/or communicate with the first user device 102, the second user device 111, and/or the cooking device system 168. In such an example, the processor 126 may be communicatively coupled (and potentially physically or electrically coupled) to the heat source(s) 121 and/or the first user device 102 and/or the second user device 111, and/or the cooking device system 168.

The network interface 128 of the heating system 120 may comprise any suitable device operable to receive information from communications network 135 and subnetworks 135*a*-*c*, transmit information through communications network 135 and subnetworks 135*a*-*c*, receive information from heat source 121, transmit information to heat source 121, perform processing of information, communicate to other devices, or any combination of the preceding. For example, the network interface 128 may receive temperature information, sensor information, or other measurement information 125 associated with the cooking of a food item 130 from the first and/or second user devices 102, 111 and/or the interactive electronic cookbook 106. In certain embodiments, the network interface 238 may include any port or connection, real or virtual, (including any suitable hardware and/or software, including protocol conversion and data processing capabilities, to communicate through a LAN, MAN, WAN, or other communication system) that allows heating system 120 to exchange information with first user device 102, second user device 111, communications network 135, subnetworks 135*a-c,* cooking device system 168, any other components of system 100, or any combination thereof.

The user interface system 127 of the heating system 120 may include any suitable components that allow a user (e.g., first and/or second users 101, 110) to provide one or more inputs into the heating system 120 and/or that allow the heating system 120 to provide output (such as a visual output) to the user of heating system 120. For example, the user interface system 127 may include a touch sensor that allows the user to input a desired amount of energy that is to be used by the heating system 120 to cook a food item 130. As another example, the user interface system 127 may include light sources that may provide a visual representation of the amount of energy that is currently being used by the heating system 120 to cook a food item 130. The heat source system's 120 processor 126 may communicatively couple to network interface 128, user interface system 127, and memory 122, and may control the operation of heating system 120 by processing information received from network interface 128, user interface system 127, and memory 122. In certain embodiments, processor 126 includes any hardware, software, or a combination thereof, that operates to control and process information. For example, processor 126 may be configured to execute a heat source system management application 123, which may be utilized to control the operation of heating system 120. The heat source system management application 123 may be utilized by the processor 126 to provide an amount of energy to cook a food item 130, and to communicate with the first and/or second user devices 102, 111 to assist the user in cooking. In certain embodiments, processor 126 may be a programmable logic device, a microcontroller, a microprocessor, any suitable processing device, or any combination thereof.

The heating system 120 may also include a memory 122 that stores, either permanently or temporarily, data, operational software, or other information for processor 126. The memory 122 may include any one or a combination of volatile or non-volatile local or remote devices suitable for storing information. For example, memory 122 may include RAM, ROM, magnetic storage devices, optical storage devices, any other suitable information storage device, or any combination thereof. In certain embodiments, memory 122 may include any suitable information for use in the operation of heating system 120. As shown in FIG. 3, memory 122 may include heat source system management application 123, cooking instructions 124, and measurement information 125 (described later in this disclosure). Heat source system management application 123 may be a software application that includes a suitable set of instructions, logic, or code embodied in a computer-readable storage medium and operable to facilitate the operation of heating system 120. The cooking instructions 124 may be any set of instructions, such as machine instructions or program instructions, which may be utilized by the heating system 120 to assist a user in cooking a food item 130. For example, the cooking instructions 124 may be a temperature that a food item 130 is to be cooked at (such as 375° Fahrenheit), a duration of time that a food item 130 is to be cooked at a particular temperature (such as 45 minutes at 375° Fahrenheit), a food identifier that identifies an ingredient(s) to be added to the food item 130 (such as salt or pepper), any other information associated with cooking or a cooking recipe, or any combination thereof. In certain embodiments, the cooking instructions 124 may be machine instructions, which may be utilized by the heating system 120 to automatically activate or deactivate the heat source 121, set a duration of time for the heat source 121 to be powered on, set a temperature for the heat source 121, perform any action with the heat source 121 or any other component of the heating system 120, or a combination thereof. In certain embodiments, the cooking instructions 124 may be received by the heating system 120 from the first and/or second user devices 102, 111. In certain embodiments, the cooking instructions 124 may be provided to and/or utilized by the cooking device system 168, such as to activate and/or deactivate the sensors 175*a-d* of the cooking device 170. The measurement information 125 may be any set of measurements associated with a food item 130 in (or adjacent to) the cooking device system 168. For example, the measurement information 125 may be a current temperature associated with the food item 130 (e.g., the current temperature the food item 130 is being cooked at), a weight measurement associated with the food item 130, an acidity measurement associated with the food item 130, a measure of the degree to which chemical reactions associated with cooking have occurred during cooking, any other measurement associated with the food item 130 (or the cooking device system 168), or any combination thereof. In certain embodiments, the measurement information 125 may be received by the heating system 120 from the sensors 175*a-d* of the cooking device 170 of the cooking device system 168.

The system 100 may also include a food item 130, for which exists one or more recipes in the interactive electronic cookbook 106 and in other mediums, devices, and/or other locations. The food item 130 may be any type of food item, such as, but not limited to, any type of carbohydrate, any type of protein, any type of fat, or any combination thereof. For example, the food item 130 may be meats, vegetables, breads, soups, desserts, pastas, drinks, any type of food item 130, or a combination thereof. The first user 101 and/or the second user 110 may desire to prepare the food item 130, such as by utilizing one or more recipes provided by the interactive electronic cookbook 106 or elsewhere. The food item 130 may be prepared by utilizing a combination of the first and/or second user devices 102, 111, the heating system 120, the cooking device system 168, and/or any other suitable device, program, and/or component of the system 100. Illustratively, food item 130 is shown as a steak in FIGS. 2 and 7-8.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, physical networks, network links, or other componentry, and may be controlled by a service provider. The communications network 135 may also include and be connected to a short-range wireless network (e.g., Bluetooth network, Bluetooth low power network, Bluetooth 5 network, ANT+ network, Zigbee network (IEEE 802.15.4)), a Wi-Fi network, a cloud-computing network, a phone network, a wireless network, an Ethernet network, a satellite network, a broadband network, a cellular network, a private network, a cable network, the Internet, an internet protocol network, a content distribution network, a virtual private network, a virtualized network, a public switched telephone network (PSTN), a public or private data network, a LAN, a MAN, a WAN, a WPAN, an infrared communications network, a local network, any network, or any combination thereof. Illustratively, server 140 and server 150 are shown as being included within communications network 135.

In certain embodiments, the communications network 135 may also include subnetwork 135*a*, subnetwork 135*b*, subnetwork 135*c*, and/or any other subnetworks. In certain embodiments, the subnetworks 135*a-c* may be separate networks that reside within the larger communications network 135, however, in other embodiments, the subnetworks 135*a-c* may be separate networks within a completely separate network. In certain embodiments, the subnetworks 135*a-c* may be separate standalone networks. Much like for communications network 135, the subnetworks 135*a-c* may also include and be connected to a short-range wireless network (e.g., Bluetooth network, Bluetooth low power network, Bluetooth 5 network, ANT+ network, Zigbee network (IEEE 802.15.4)), a Wi-Fi network, a cloud-computing network, a phone network, a wireless network, an Ethernet network, a satellite network, a broadband network, a cellular network, a private network, a cable network, the Internet, an internet protocol network, a content distribution network, a virtual private network, a virtualized network, a PSTN a public or private data network, a LAN, a MAN, a WAN, a WPAN, an infrared communications network, a local network, any network, or any combination thereof. In certain embodiments, subnetworks 135*a-c* may be the same type of network, however, in certain embodiments, subnetworks 135*a-c* may comprise different types of networks. For example, subnetwork 135*a* may be a Bluetooth short range wireless network, subnetwork 135*b* may be a cellular network, and subnetwork 135*c* may be a Wi-Fi network. Illustratively, subnetwork 135*a* communicatively links first user device 102 (and/or second user device 111) with food source system 120, subnetwork 135*b* communicatively links first user device 102 (and/or second user device 111) with cooking device 170, and subnetwork 135*c* communicatively links cooking device 170 with heating system 120. Notably, however, each of the subnetworks 135*a-c* may be utilized to communicatively link any of the devices, components, programs and/or systems of system 100 together in any desired fashion so as to enable the exchange of data and information.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 100, such as those requested by applications executing on the first and second user devices 102, 111. Additionally, the servers 140, 150 may be configured to perform various operations of the interactive electronic cookbook 106, the heat source system management application 123, the cooking device management application 173, any application supporting the functionality of the system 100, any other component and/or program of the system 100, or a combination thereof. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, operations performed and output generated by the servers 140, 150, 160, operations performed and output generated by the applications supporting the functionality of the system 100, operations performed and output generated by the cooking device management application 173, operations performed and output generated by the heat source system management application 123, operations performed and output generated by any component of the system 100, or any combination thereof. In certain embodiments, the database 155 may store a record of any and all information obtained from any data sources utilized by the system 100 to facilitate the operative functions of the system 100 and its components, store feedback received from the first and second users 101, 110 and/or the first and second user devices 102, 111, store inputs entered into or utilized to interact with the applications supporting the functionality of the system 100, store software code supporting the functionality of the system 100, store recipes, store recipe stages and information relating thereto, store cooking stages and information relating thereto, store enhanced recipes, store photographs, images, video content, audio content, virtual reality content, augmented reality content, and/or any other content associated with the recipes, store machine instructions for causing the cooking device 170 and/or heat source 121 to operate in accordance with the machine instructions, store any information generated and/or received by the system 100, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the interactive electronic cookbook 106, the servers 140, 150, 160, the first user device 102, the second user device 111, the cooking device 170, the cooking device system 168, the heating system 120, any devices in the system 100, any other device, any program, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g., first user 101 and/or second user 110), such as, but not limited to, a username, a password, contact information, demographic information, an identification of applications used or associated with the individual, any attributes of the individual, any other information, or a combination thereof. Device profiles may include any type of information associated with a device, such as, but not limited to, operating system information, hardware specifications, information about each component of the device (e.g., sensors, processors, memories, batteries, etc.), attributes of the device, any other information, or a combination thereof.

In certain embodiments, the database 155 may store algorithms facilitating the operation of the learning engine 185 (described later in this disclosure), the natural language processing engine 180 (described later in this disclosure), the system 100 itself, any software application utilized by the system 100, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100. Moreover, the database 155 may be configured to store questions generated by the system 100, responses received from the first and/or second users 101, 110 in response to the questions, or any combination thereof.

The system 100 may also include a cooking device system 168, which may be utilized by the first and/or second users 101, 110 to cook food items 130 according to recipes, such as recipes provided by interactive electronic cookbook 106. The cooking device system 168 may include any suitable components that may be used for cooking food items 130. In certain embodiments, the cooking device system 168 may also communicate with the heating system 120 to assist a user with cooking, such as by providing sensor information obtained from the sensors 175*a-d* to the heating system 120. Additionally, the cooking device system 168 may further communicate with the first and/or second user devices 102, 111 to assist the first and/or second users 101, 110 in cooking and/or to provide information associated with the cooking device system 168. As shown in FIGS. 2-3, the cooking device system 168 may include a cooking device 170, a cooking device management application 173, sensors 175*a-d,* a network interface 174, a processor 172, and a memory 171. The cooking device 170 may be any device that may be utilized to cook a food item 130. For example, the cooking device 170 may be a device that includes a food support platform that may support, hold, contain, or enclose the food item 130 while the food item 130 is being cooked. The cooking device 170 may be, but is not limited to being, a pot, a pan, a vessel, a tray, a grill platen, a grate, an oven, a pressure cooker, a rice cooker, a slow cooker, a microwave oven, a toaster oven, an oven, a teapot, any other device that may support, hold, or enclose a food item while it is being cooked, or any combination thereof. As another example, the cooking device 170 may be a cooking utensil, such as a spoon, fork, tongs, a spatula, a measurement probe (such as a probe that measures temperature), any other utensil that may be used while cooking a food item 130, or any combination thereof. In FIGS. 2-3, the cooking device 170 is illustratively shown as a cooking pan.

As indicated above, the cooking device 170 may include one or more sensors 175*a-d*. The sensors 175*a-d* may be any sensor that may measure, sense, or otherwise provide a measurement associated with a food item 130, ingredients associated with a food item 130, liquids in which the food item 130 is cooked, anything within range of the food item 130, or any combination thereof. For example, sensors 175*a-d* may be temperature sensors that measure a temperature of the food item 130, a temperature adjacent the food item 130 (such as a temperature of a portion of the cooking device 170 or a temperature of the environment inside or adjacent the cooking device 170), a temperature that the food item 130 is being cooked at, any other temperature associated with cooking the food item 130, or any combination of the preceding. As another example, the sensors 175*a-d* may measure volume, weight, moisture, acidity, alkalinity, color, pressure, liquid levels, the denaturing of one or more proteins, any other attributes of the food item and/or the cooking device 170, or any combination of the preceding. As a further example, the sensors 175*a-d* may be chemical sensors, an accelerometer to measure a user's physical movement of the food item 130 and/or the cooking device 170, motion sensors or other location sensors to determine if a user and/or the food item 130 is at a particular location, any other type of sensor, or any combination of the preceding.

In certain embodiments, the sensors 175*a-d* may measure or sense the same type of measurement (such as temperature), or one or more of the sensors 175*a-d* may measure different types of measurements than the other measurement sensors (e.g., a first set of sensors 175*a-b* may measure temperature and a second set of sensors 175*c-d* may measure weight and/or liquid level). Illustratively, the sensors 175*a-d* are sensors that measure a temperature of various portions of the cooking device 170. The sensors 175*a-d* may be positioned at any location in, on, or adjacent the cooking device system 168 so as to allow the sensors 175*a-d* to measure information associated with the food item 130, and to further allow the sensors 175*a-d* to transmit such information to the processor 172. The sensors 175*a-d* may be coupled to (or otherwise positioned at) any location in, on, or adjacent the cooking device system 168, and the sensors 175*a-d* may be coupled to (or otherwise positioned at) such a location in any manner. For example, the sensors 175*a-d* may be bonded to the location (using an adhesive, for example), connected to the location using a rivet or a clip, positioned in-between two or more materials at the location (such as two or more layers of the material of the cooking device 170), formed integral with a device at the location (such as formed integral with all or a portion of the cooking device 170), coupled to the location in any other manner, or any combination thereof.

As indicated above, the cooking device system 168 includes network interface 174, a processor 172, and a memory 171. The network interface 174, processor 172, and memory 171 may be positioned at any location on, in, or adjacent the cooking device system 168 so as to allow the network interface 174 and processor 172 to communicate with the sensors 175*a-d,* and further communicate with the first user device 102, the second user device 111, and/or heating system 120. In certain embodiments, the processor 172 may be communicatively coupled (and potentially physically or electrically coupled) to the sensors 175*a-d* and/or the first user device 102, the second user device 111, and/or the heating system 120. Illustratively, the network interface 174, processor 172, and memory 171 are positioned in (or on) the handle of the cooking device 170. In certain embodiments, the positioning of the network interface 174, processor 172, and memory 171 may protect these components from excessive heat. The network interface 174 may be any suitable device configured to receive information from communications network 135 and/or subnetworks 135*a-c,* transmit information through communications network 135 and/or subnetworks 135*a-c,* receive information from sensors 175*a-d,* transmit information to sensors 175*a-d,* perform processing of information, communicate to other devices, or any combination thereof. For example, network interface 174 may receive measurements from sensors 175*a-d.* As another example, network interface 174 may transmit measurement information 125 obtained from the sensors 175*a-d* to heating system 120. In certain embodiments, network interface 174 may include any port or connection, real or virtual, (including any suitable hardware and/or software, including protocol conversion and data processing capabilities, to communicate through a LAN, MAN, WAN, or other communication system) that allows cooking device system 168 to exchange information with first user device 102, second user device 111, communications network 135, subnetworks 135*a-c,* heating system 120, and/or other components of system 100.

The processor 172 of the cooking device system 168 communicatively couples to network interface 174 and memory 171, and controls the operation and administration of cooking device system 168 by processing information received from network interface 174 and memory 171. In certain embodiments, the processor 172 may include hardware, software, or a combination thereof, that operates to control and process information. For example, processor 172 may execute a cooking device system management application 173 to control the operation of cooking device system 168, such as to communicate with the heating system 120 to assist the first and/or second user 101, 110 in cooking, or to communicate with the first and/or second user device 102, 111 to assist the first and/or second users 101, 110 with cooking. Processor 172 may be a programmable logic device, a microcontroller, a microprocessor, any suitable processing device, or any combination thereof. In certain embodiments, the memory 171 stores, either permanently or temporarily, data, operational software, or other information for processor 98. The memory 171 may include any one or a combination of volatile or non-volatile local or remote devices suitable for storing information. For example, memory 171 may include RAM, ROM, magnetic storage devices, optical storage devices, any other suitable information storage device, or any combination of the preceding. In certain embodiments, memory 171 may include any suitable information for use in the operation of cooking device system 168. As illustrated, memory 171 may include and store cooking device system management application 173. Cooking device system management application 173 may be an application that includes any suitable set of instructions, logic, or code embodied in a computer-readable storage medium and is configured to facilitate the operation of cooking device system 168.

In addition to the cooking device system 168, the system 100 may also include a natural language processing engine 180, which may be comprised of hardware, software, or a combination thereof. The natural language processing engine 180 may include a series of modules and/or components including, but not limited to, a controller, one or more semantic libraries and/or databases, and/or one or more graph databases. In certain embodiments, the natural language processing engine 180 may reside and/or execute in the communications network 135 (such as in servers 140 and/or 150), the server 160, the first and/or second users devices 102, 111, the heating system 120, the cooking device system 168, any other component or device of the system 100, or any combination thereof. Notably, the natural language processing engine 180 may include and incorporate the functionality of any existing natural language processing system. For example, the natural language processing engine 180 may incorporate and utilize any of the functionality described in the following documents, all of which are incorporated herein by reference: U.S. Pat. No. 8,145,854 entitled "Method and apparatus for controlling automated food preparation systems"; U.S. Pat. No. 9,721,008 entitled "Recipe generation utilizing natural language processing"; U.S. Patent Application Publication No. 20170139902 entitled "Modifying Existing Recipes to Incorporate Additional or Replace Existing Ingredients"; U.S. Pat. No. 9,443,005 entitled "Systems and methods for natural language processing"; U.S. Patent Application Publication No. 20160140123 entitled "Generating a Query Statement Based on Unstructured Input"; U.S. Pat. No. 9,223,901 entitled "Method for selecting elements in textual electronic lists and for operating computer-implemented programs using natural language commands"; U.S. Pat. No. 9,218,163 entitled "Generating complex event processing rules"; U.S. Patent Application Publication No. 20150234805 entitled "System and Method for Interacting with Event and Narrative Information As Structured Data"; U.S. Pat. No. 9,053,423 entitled "Assisted update of knowledge base for problem solving"; U.S. Patent Application Publication No. 20140288920 entitled "Assisted Update of Knowledge Base for Problem Solving"; U.S. Pat. No. 8612261 entitled "Automated learning for medical data processing system"; U.S. Patent Application Publication No. 20130093774 entitled "Cloud-based Animation Tool"; U.S. Patent Application Publication No. 20130006608 entitled "Generating Complex Event Processing Rules"; U.S. Pat. No. 8,326,603 entitled "Memory system for storing and retrieving experience and knowledge with natural language queries"; U.S. Patent Application Publication No. 20120278084 entitled "Method for Selecting Elements in Textual Electronic Lists and for Operating Computer-Implemented Programs Using Natural Language Commands"; U.S. Pat. No. 7,890,928 entitled "Mechanism and system for representing and processing rules"; U.S. Pat. No. 7,873,509 entitled "Memory system for storing and retrieving experience and knowledge with natural language utilizing state representation data, word sense numbers, function codes, directed graphs, context memory, and/or purpose relations"; U.S. Pat. No. 7,606,782 entitled "System for automation of business knowledge in natural language using rete algorithm"; U.S. Pat. No. 7,349,840 entitled "Memory system for storing and retrieving experience and knowledge with natural language utilizing state representation data, word sense numbers, function codes, directed graphs and/or context memory"; U.S. Pat. No. 7,242,751 entitled "System and method for speech recognition-enabled automatic call routing"; U.S. Patent Application Publication No. 20060133587 entitled "System and method for speech recognition-enabled automatic call routing"; U.S. Patent. Application Publication No. 20050027507 entitled "Mechanism and system for representing and processing rules"; U.S. Patent Application Publication No. 20040107088 entitled "Memory system for storing and retrieving experience and knowledge with natural language utilizing state representation data, word sense numbers, function codes, directed graphs and/or context memory"; U.S. Pat. No. 6,609,091 entitled "Memory system for storing and retrieving experience and knowledge with natural language utilizing state representation data, word sense numbers, function codes and/or directed graphs"; U.S. Pat. No. 6,473,729 entitled "Word phrase translation using a phrase index"; U.S. Pat. No. 6,243,670 entitled "Method, apparatus, and computer readable medium for performing semantic analysis and generating a semantic structure having linked frames"; U.S. Pat. No. 6,138,087 entitled "Memory system for storing and retrieving experience and knowledge with natural language utilizing state representation data, word sense numbers, function codes and/or directed graphs"; U.S. Pat. No. 5,715,468 entitled "Memory system for storing and retrieving experience and knowledge with natural language"; U.S. Pat. No. 5,365,433 entitled "System for automatically programming a functional database"; and U.S. Pat. No. 4,862,408 entitled "Paradigm-based morphological text analysis for natural languages."

In certain embodiments, the natural language processing engine 180 may be configured to include functionality to comprehend human language and/or speech, text in digitally scanned documents, media content in digital files, any type of audio content, virtual reality content, augmented reality content, any other comprehendible and/or parseable content, or any combination thereof. For example, the natural language processing engine 180 may be configured to comprehend human language and/or speech that is spoken, written, symbolized, or a combination thereof, and may be configured to determine associated contextual information. In certain embodiments, the natural language processing engine 180 may be configured to analyze and/or parse content from recipes, such as digital recipes uploaded into the interactive electronic cookbook 106 and/or integrated into the interactive electronic cookbook 106, digital recipes available at a URL, digital recipes existing and/or accessible on the first and/or second user devices 102, 111, digital recipes on any of the devices of the system 100, digital recipes from any source external to the system 100, digital recipes that have been scanned into the system 100, photographs of recipes taken by the first and/or second user devices 102, 111, or any combination thereof. The natural language processing engine 180 may apply analysis rules to the text (e.g., extracted terms) and/or content (e.g., any type of content) parsed from the digital recipes to determine whether the parsed text and/or content is correlated and/or has an association with machine instructions and/or content existing in the system 100, such as in the database 155 and/or memories of the various devices of the system 100. In certain embodiments, the natural language processing engine 180 may be configured to deploy the rules to convert the digital recipes into an automated cooking appliance instruction set, which may be displayed on the first and/or second user devices 102, 111 as the interactive electronic cookbook 106. In certain embodiments, the automated cooking appliance instruction set may correspond with cooking instructions 124 and may be utilized to semi-automate the preparation and/or cooking stages utilized to make the food item 130 and/or fully-automate the various recipe and/or cooking stages utilized to make the food item 130. For example, the machine instruction set may be utilized to activate and/or deactivate the heat source 121 of the heating system 120, activate and/or deactivate the cooking device 170, activate and/or deactivate the sensors 175*a-d*, cause the heat source 121 to turn up or down the amount of energy produced by the heat source 121 according to the instructions, cause the heat source 121 to output heat for a selected period of time, cause the measurement information 125 from the sensors 175*a-d* to be transmitted to any device in the system, replace recipe stages of a digital recipe, modify recipe stages of a digital recipe, perform and/or facilitate any suitable operation of the system 100, or any combination thereof.

In certain embodiments, the natural language processing engine 180 may be configured to utilize its analysis rules to consider the context of the food being cooked according to the digital recipe, best practices as appropriate for a particular device (e.g., cooking device 170) being utilized to cook the food item 130 associated with the recipe, the specificity of the recipe with regard to relative heating power and/or observable changes in color and texture of the food during preparation and/or cooking. In certain embodiments, the natural language processing engine 180 may be utilized to determine if text and/or content parsed from certain recipe stages corresponds with text and/or content existing in the system 100, which may be utilized to enhance one or more recipe stages of the digital recipe. For example, the natural language processing engine 180 may determine that a particular recipe stage in a digital recipe indicates that a steak should be seared on both sides for 30 seconds. Based on the keywords "steak" and/or "seared" extracted from the recipe stage of the digital recipe, the natural language processing engine 180 may match these keywords to a known and detailed time, temperature, key ingredient, and food manipulation instruction (e.g., an instruction describing how the steak should be manipulated), which may be utilized to facilitate the cooking and/or food preparation process. Additionally, the instruction may be utilized to replace and/or modify the recipe stage to include the known and detailed time, temperature, key ingredient, and food manipulation information. In certain embodiments, the system 100 may store media content, such as photographs, video content (e.g., a video of recipe instructions), audio content (e.g., audio recording corresponding to the text of a recipe and/or the video of the recipe instructions), augmented reality content, virtual reality content, temperature profiles, time profiles, and/or any other information associated with a recipe in association with terms, keywords, and/or identifiers (e.g., such as in semantic libraries) so that when such terms, keywords, and/or identifiers are detected in a recipe stage of a parsed digital recipe, the system 100 may modify the recipe stage to include the media content stored in association with the terms, keywords, and/or identifiers. In certain embodiments, the natural language processing engine 180 may determine associations and similarities between the parsed text and content obtained from a digital recipe with terms, keywords and/or identifiers stored in the system 100, such as by recognizing patterns in the attributes that correspond to the text and content, by determining synonyms for the text and/or content, by recognizing images and/or video (or other content) having similarities to the media content stored in the system 100, by performing any other natural language processing capabilities, or any combination thereof.

The controller of the natural language processing engine 180 may serve as the component of the natural language processing engine 180 that controls the functions and operations of the natural language processing engine 180. In particular, the controller may be configured to direct the natural language processing engine 180 to parse text and/or content from a digital recipe, analyze the parsed text and/or content for keywords, determine whether the parsed text and/or content match keywords, content, terms, and/or identifiers stored in the system 100 in connection with machine instructions, and/or perform any of the other operations of the natural language processing engine 180. In certain embodiments, the controller may be configured to pass the parsed text and/or content through a series of semantic libraries so as to determine an initial set of potential keywords, content, and terms related to the parsed text and/or content obtained from the recipe and/or recipe stage. Additionally, the controller may utilize any number and/or any type of natural language processing algorithms to facilitate in this process. In certain embodiments, the keywords, content, and terms of the semantic libraries may be related to the parsed text and/or content based on the keywords, content and terms of the semantic libraries having words, letters, or sounds in common with the parsed text and/or content, based on the keywords, content, and terms being in a same subject matter area of the parsed text and/or content, based on the keywords, content and terms being typically used in conjunction with the terms used in the parsed text and/or content, based on the keywords, content, and terms having any relation to the parsed text and/or content, based on the keywords, content and terms matching the parsed text and/or content (e.g., matching nouns and verbs in the parsed text with terms in the libraries that are tied to machine instructions), or any combination thereof. The semantic libraries may incorporate any functionality and features of existing and/or traditional semantic query libraries. Additionally, the semantic libraries may be configured to include repositories of information and data, along with relationships and associations between keywords, words, content, and their meanings, to enable the controller to determine content and terms relevant and/or related to the parsed text and/or content obtained from the digital recipe. The semantic libraries may enable the controller to determine the relevant content and terms based on the intent and contextual meaning of the terms contained within the parsed text and/or content obtained from the recipe. In certain embodiments, the data and information contained in the semantic libraries may be structured and formatted so as to enable the controller to consider the context of the parsed text and/or content including, but not limited to, a location associated with the parsed text and/or content, an intent associated with the parsed text and/or content, variations in the parsed text and/or content, concepts associated with the parsed text and/or content, a type of food group associated with the parsed text and/or content, a country of origin associated with the food associated with the parsed text and/or content, a style of cooking associated with the parsed text and/or content, a type of cooking device to be utilized to cook a food item 130 associated with the parsed text and/or content any other contexts, or any combination thereof.

In certain embodiments, once the initial set of potential keywords, terms, and/or content are determined by the controller based on the passing of the parsed text and/or content through the semantic libraries, the controller may then compare the initial set of keywords, terms and/or content to a graph database (e.g., database 155) to determine if additional terms and/or content are available and/or if more optimal terms and/or content related to the parsed text and/or content exist. The graph database utilized by the natural language processing engine 180 may incorporate any of the features and functionality of a traditional graph database, and may include additional keywords, terms, and/or content and machine instructions, media content, and/or information associated with the additional keywords, terms, and/or content. In certain embodiments, the graph database may utilize graph structures to represent and store data. Notably, the graph database may store relationships between the data and content stored within the graph database, and may store any type of data, content, and/or terms that may be utilized to assist in determining the content related to the parsed text and/or content obtained from the recipe. Data and content that is related to one another within the graph database may be readily retrieved by the graph database and/or system 100 based on their associations and/or correlations. In certain embodiments, the graph database may include additional keywords, content, and terms related to or associated with the parsed text and/or content that may not be contained in the semantic libraries. As a result, the graph database may serve as an additional resource for the controller to determine additional keywords, content, and terms associated with the parsed text and/or content that may be utilized by the natural language processing engine 180 to retrieve additional content and/or instructions that may be utilized to enhance the recipe. If, based on the comparison to the graph database, additional keywords, terms, and/or content related to the parsed text and/or content obtained from the recipe are determined by the controller, these additional terms and/or content, along with the initial terms and/or content determined based on the semantic library comparison, may be utilized obtain media content, machine instructions, and information to enhance and/or modify the recipe.

Once the keywords, terms, and/or content are determined to be associated with the parsed text and/or content from the digital recipe, the natural language processing engine 180 may provide machine instructions and/or enhanced content associated with the keywords, terms, and/or content to the first and/or second user devices 102, 111 and/or to other devices in the system 100, such as for incorporation into a recipe of the interactive electronic cookbook 106. In certain embodiments, the first and/or second users 101, 110 may be given the option to accept or reject the machine instructions and/or enhanced content as a replacement for a recipe stage and/or a modification of the recipe stage. The natural language processing engine 180 may record the acceptances and/or rejections. Acceptances may be utilized to determine which machine instructions are popular and have a higher probability of correlating with parsed text and/or content from a recipe. Rejections may be utilized to determine which machine instructions are less popular and have a lower probability of correlating with the parsed text and/or content from the recipe. In this way, the system 100 may learn over time which content, terms, and words have a higher priority than other content, words and terms, and can provide machine instructions correlating to the higher priority content, terms, and words at a higher frequency than content, terms, and words having a lower priority.

In certain embodiments, if the natural language processing engine's 180 parsing and analysis indicates that the digital recipe analyzed provides a high level of precision (e.g., a threshold level of precision) guidance with respect to how long a particular cooking step in a recipe should take to achieve a desired result, the application of the analysis rules may enable a more accurate determination of the optimal cooking time and temperature profile. This may be because the higher the precision of the guidance the greater the likelihood that the parsed terms and/or content corresponding to the cooking step will correlate with keywords, terms, and/or content associated with machine instructions that include cooking time and temperature profiles that are optimal in achieving the objective of the particular cooking stage. In certain embodiments, if the natural language processing engine's 180 parsing and analysis indicates that the digital recipe analyzed provides a lower level of precision (e.g., below a threshold level of precision), the natural language processing engine 180 may formulate and/or generate a series of questions to be presented to the first and/or second user devices 102, 111 to obtain answers that will increase the precision of the guidance. The information obtained in answers may be utilized to generate superior guidance in cooking that is precise with regard to cooking times, cooking temperature, and manipulation of ingredients utilized to make a food item 130. This may be particularly useful when the original author/creator of the recipe may have used a particular cut of meat or source of protein that is different from what the first and/or second user 101, 110 has. As an example, if the natural language processing engine 180 parses and analyzes the text and/or content of a recipe stage of a recipe for cooking steak, it may determine that the user wishes to "sear" a "steak," and that the following questions may be utilized to improve the recipe and/or the end results of the recipe: 1. Is it a beef, lamb, pork, or veal steak? 2. What cut of steak do you have? 3. How thick is the specific steak that you have? 4. How well would you like your steak cooked? The answers provided by the first and/or second users 101, 110 in response to the questions may be utilized to select the optimal machine instructions for replacing some or all recipe stages of the recipe and/or potentially suggest different cooking techniques, cooking devices, and/or food-related advice based on the answers to the questions. In certain embodiments, the system 100 may limit the possible answers to the questions to finite choices that are already well-calibrated for cooking with a particular appliance (e.g., cooking device 170) so as to enhance the cooking experience for the first and/or second users 101, 110 in rapid fashion. In certain embodiments, the responses to the questions may be utilized to match the recipe stage to machine instructions and/or enhanced content, such as photographs, video instructions, audio content associated with the parsed text and/or content, which may then be utilized to enhance the recipe stage in the recipe. In certain embodiments, the responses to the questions may be utilized by the natural language processing engine 180 to obtain temperature set points and timers, such as when the user executes the recipe via the interactive electronic cookbook 106.

The natural language processing engine 180 may also be configured to select which types of stages in a recipe should be enhanced, modified, or a combination thereof. For example, the natural language processing engine 180 may be configured to only enhance recipe stages that correspond to cooking stages. The natural language processing engine 180 may determine that a recipe stage corresponds to a cooking stage by parsing the text and/or content from the recipe and comparing the parsed text and/or content to the keywords, terms, and/or content in the database 155, in the other devices of the system 100, and/or even in external repositories of data and information. If the parsed text and/or content corresponds to keywords, terms and/or content related to a cooking step of a recipe (e.g., parsed text for the stage includes the keyword "broil," which is a cooking term), the natural language processing engine 180 may obtain media content and instructions known to be associated with the cooking term and enhance the recipe step using the media content and instructions. If, on the other hand, the parsed text and/or content does not correspond to keywords, terms, and/or content related to a cooking step of a recipe, the system 100 may opt to not enhance the recipe and/or not convert the recipe step. However, in certain embodiments, if the recipe step or stage does not correspond to a cooking step (e.g., the stage does not use heat to transform ingredients in the recipe), it may still be desirable to provide enhanced content that is more precise and helpful with regard to food preparation instructions, particularly when they not only save the user time, but also improve food and personal safety. Additionally, enhanced and/or conversion of non-cooking steps of the recipe may also improve the quality of the end result of the food item 130. For example, although the chopping of ingredients is not a step that uses heat to transform the ingredients, using proper and uniform size ingredients may affect the end result of the cooking process because heat from a cooking device 170 or medium that surrounds the food will more quickly transfer to smaller and uniform ingredients comprising the food.

In certain embodiments, the system 100 may also include a learning engine 185. The learning engine 185 may be software, hardware, or a combination thereof, and may be supported by any suitable machine learning and/or artificial intelligence algorithms The learning engine 185 may be a program, system, and/or device that determines patterns and/or associations with regard to recipes, parsed text and/or content from recipes, recipe stages within recipes, favorite types of foods and/or ingredients of the first and/or second users 101, 110, preferred cooking styles, preferred cooking utensils and/or devices, the types of media content that the first and/or second users 101, 110 prefer with their recipes, food textures preferred by the first and/or second users 101, 110, a level of doneness for food items 130 preferred by the first and/or second users 101, 110, any other learnable information, or any combination thereof. The learning engine 185 may allow for improved efficiency and accuracy of the system 100, while enabling more advanced processing of information traversing the system 100. In certain embodiments, the learning engine 185 may allow for supervised learning, which may involve processing feedback received from the first and/or second users 101, 110 received via the first and/or second user devices 102, 111. For example, the learning engine 185 may receive feedback and/or inputs from the first and/or second users 101, 110 that confirm, reject, and/or modify enhancements to digital recipes that have been proposed by the system 100. Based on the feedback, the learning engine 185 may generate instructions that may be utilized to adjust the operation of the natural language processing engine 180 so that it performs analyses and performs matches of parsed text and content to keywords, terms, and/or media content in a manner that is tailored based on the feedback. For example, if the system 100 proposed incorporating audio content into a recipe stage based on the analysis and matching performed by the natural language processing engine 180, and the first user 101 does not want to incorporate the audio content into the recipe stage, the learning engine 185 may determine that the first user 101 may not like audio content with recipes and may provide an instruction to the natural language processing engine 180 that causes the natural language processing engine 180 to reduce a weight given to audio content (or not propose audio content altogether) when proposing enhancements to a recipe stage. Additionally, the learning engine 185 may support unsupervised learning by automatically monitoring actions performed by the first and/or second users 101, 110 and/or by the devices without having to consider feedback.

Operatively, the system 100 may operate according to the following exemplary use-case scenario. Of course, the system 100 may be utilized for any suitable use-case scenario and the scenario described below is merely for illustration purposes. The use-case scenario described herein demonstrates the operation of the system 100 and the conversion of a recipe into an enhanced recipe with a cooking instruction/machine instruction set 124, as is shown in FIGS. 4-8. In this use-case scenario, the first user 101 may desire to prepare a food item 130, such as a beef steak, according to a digital recipe that the first user 101 found online at a website URL (or a printed recipe from a printed cookbook), as shown in recipe 400 in FIG. 4. The recipe text of the recipe found at the URL may be ported into the interactive electronic cookbook 106 and/or into any other application of the first user device 102. In certain embodiments, if the text is not readily parseable and/or analyzable, the system 100 may execute one or more optical character recognition techniques and/or image recognition techniques on the digital recipe so as to obtain parseable text and/or content from the digital recipe. Once the digital recipe is in a form that is parseable and/or analyzable, the natural language processing engine 180 may parse the digital recipe for keywords to identify one or more recipe stages, such as keywords as shown in column 1 of table 500 of FIG. 5. In certain embodiments, the natural language processing engine 180 may parse the digital recipe for keywords that describe either a cooking technique or an intensity time of heat application, visual cues (e.g., brown, firm, crispy, etc.) ingredients, and the words (e.g., terms) that follow and/or precede keywords, such as "after", "when", "until", and/or numeric characters, particularly with a predetermined proximity to the words that express and/or quantify temperature and/or time. For example, the natural language processing engine 180 may obtain keywords and other words (e.g., terms) from the digital recipe such as, but not limited to, "skillet", "high temperature", "pre-heat", "place", "remove", "stovetop", "desired doneness", "season", "steak", "oil", "salt", "black pepper", "sear", "serve", "butter", and/or other keywords and words.

Based on the keywords and/or terms parsed from the one or more recipe stages of the digital recipe, the natural language processing engine 180 may identify cooking ingredients in each recipe stage, such by comparing the parsed keywords and/or terms to keywords, terms, and/or content in database 155 and/or in other storage mediums. The natural language processing engine 180 may then identify which recipe stages are cooking stages (e.g., a stage that uses heat to transform a food item 130 and/or ingredient of the food item 130) based on the parsed keywords and/or terms. For example, for the recipe 400, the natural language processing engine 180 may determine that at steps 1, 4, 5, 6, and 7 from recipe 400 are recipe stages that correspond to cooking stages based on the terms, "high temperature", "sear", "cook", and "until desired doneness" for each respective stage. The natural language processing engine 180 may proceed to determine at least one key ingredient in each cooking stage that is critical and/or determinative with regard to controlling cooking time of ingredients of the food item 130. In certain embodiments, the natural language processing engine 180 may identify these key ingredients on a hierarchical rule basis based on the type of ingredient, the size of the ingredient, the quantity of the cooking ingredient, and/or other factors and metrics that drive the particular cooking stage. The system 100 may then proceed to determine the cooking temperature in each cooking stage by key-ingredient-based rules, which may be utilized to consider a context-based expression of the degree of doneness (such as a steak at medium well means to compute a temperature profile to cause the steak to reach a core temperature of 135 degrees Fahrenheit), or based on ingredient-specific rules that are known to food scientists, such as from sous vide recipe compilations and the like.

The system 100 may then proceed to determine the cooking time for each key ingredient from one or more of the ingredient size, weight, heat transfer parameter for the ingredient, heat capacity, conditions associated with the devices being utilized to cook the key ingredient (e.g., heating system 120 and cooking device system 168), as well as reference to predetermined combinations of time and temperature for different food items. In certain embodiments, it may be desirable to identify the type of food preparation intended in the digital recipe. The type of intended food preparation may be utilized to determine what questions should be asked of the first user 101 (or second user 110) to improve the cooking experience and more precisely make the determination of cooking times, cooking temperatures, and food manipulation stages. The natural language processing engine 180 may determine and/or construct questions to ask the first user 101 that better identify the nature of the food item 130 and the desired outcome (e.g., medium well steak) to improve the final result. For example, if the natural language processing engine 180 determines that the user wishes to "sear" the "steak" as in recipe 400, then the answers to the following questions would improve the end results of achieving a seared steak in the way that the first user 101 prefers: 1. Is it a beef, lamb, pork, or veal steak? 2. What cut of steak do you have? 3. How thick is the specific steak that you have? 4. How well would you like your steak cooked? 5. What number of servings do you want? The answers provided by the first and/or second users 101, 110 in response to these questions may be utilized to select the optimal machine instructions for replacing some or all recipe stages of the recipe and/or potentially suggest different cooking techniques, cooking devices, and/or food-related advice based on the answers to the questions. In certain embodiments, the system 100 may limit the possible answers to the questions to finite choices that are already well-calibrated for cooking with a particular appliance (e.g., cooking device 170) so as to enhance the cooking experience for the first and/or second users 101, 110 in rapid fashion. In certain embodiments, the natural language processing engine 180 may identify matching verb and noun pairs in a text string parsed from the recipe. Non-limiting examples of such matching pairs of nouns and verbs are shown in the table 500, as shown in FIG. 5, and sample questions that the natural language processing engine 180 would generated are also shown.

A correlated match to a known time, temperature, key ingredient and manipulation instruction of the system 100 (e.g., existing in database 155 or other storage medium) based on the answers to the questions in the third column of table 500 may then result in substitution of a particular recipe stage or step with retrieved enhanced content that is stored in association with the matched instruction. In certain embodiments, the responses to the questions may be utilized to match the recipe stage to machine instructions and/or enhanced content, such as photographs, video instructions, audio content associated with the parsed text and/or content, which may then be utilized to enhance the recipe stage in the digital recipe by incorporating such content into the recipe stage. In certain embodiments, the responses to the questions may be utilized by the natural language processing engine 180 to obtain temperature set points and timers, such as when the user executes the recipe via the interactive electronic cookbook 106. In certain embodiments, based on the answers to the questions, the natural language processing engine 180 may suggest alternative cooking styles, temperatures, and/or instructions. For example, as shown in row 1 of table 500. The recipe may include the term sear and the noun steak, but based on the answers to the questions, the system 100 may determine that the steak that the first user 101 has is thicker than the steak required for the recipe. In such a scenario, the natural language processing engine 180 may suggest braising the steak instead of searing the steak and may insert a correlated machine instruction for the searing recipe stage, along with enhanced text and content suited for describing and facilitating braising the steak.

As each recipe stage is analyzed by the natural language processing engine 180, the system 100 may compile the results of the determination of each recipe and/or cooking stage. To the extent that any stages that do not involve a substitution or replacement with a correlated time, temperature, and food manipulation instruction, such stages may be optionally saved in the system 100 without modifying them. To the extent that a particular stage correlates with a previously generated match of the ingredients and the preparation technique, then the system 100 may substitute the particular recipe stage with enhanced content, such as by including photographs, video instructions, and text including further explanation of the recipe stage. In certain embodiments, the system 100 may also include graphic content to the recipe compilation based on rules and a look up library that has stock images of food and/or ingredients at various preparation stages of a recipe, and/or video content of food preparation stages. In certain embodiments, to the extent it is desirable to republish the recipes outside the interactive electronic cookbook 106 and/or the system 100, any copyrightable content may be removed by the system 100 by limiting textual or other content to unprotectable explanations of the recipe process.

Figure 7:
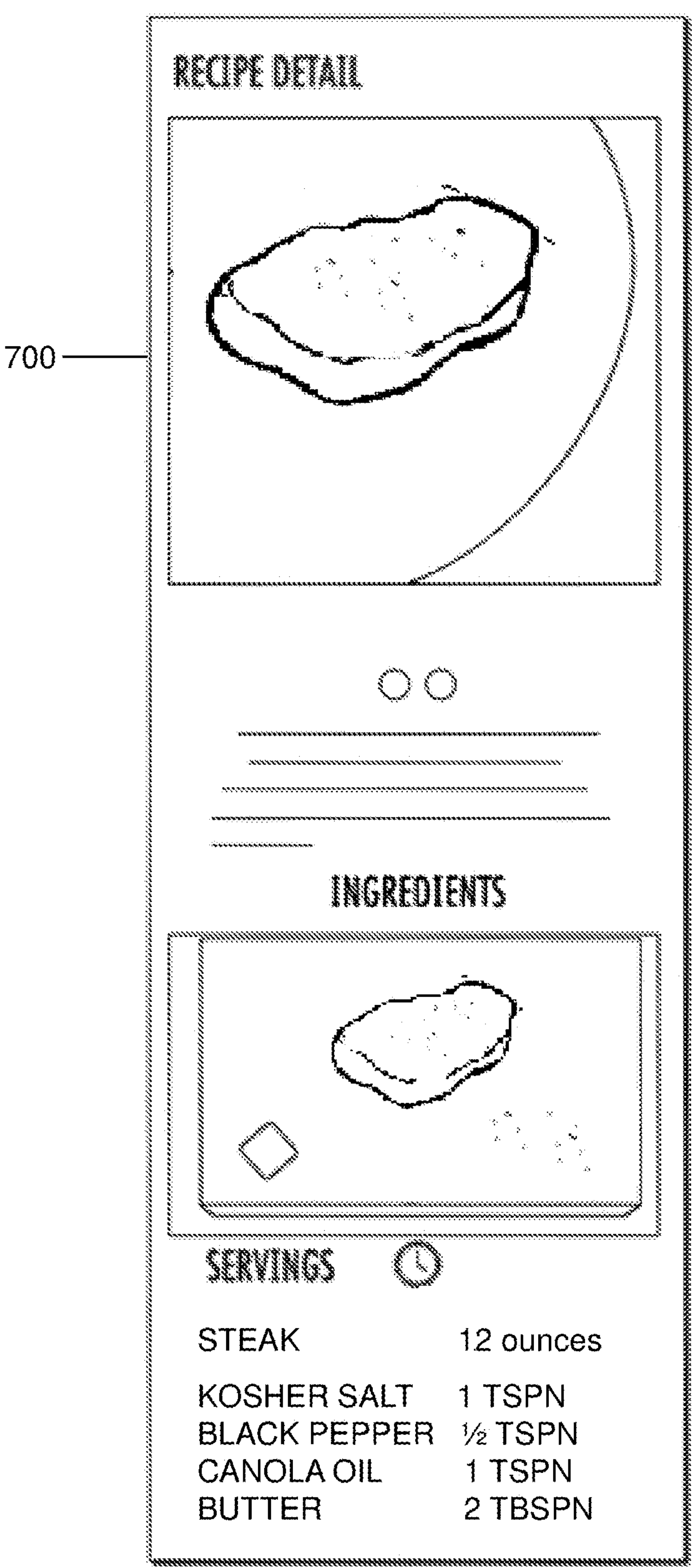
FIG. 7 is a sample portion of the enhanced recipe of FIG. 6, which includes enhanced visual and textual content.
Figure 8:
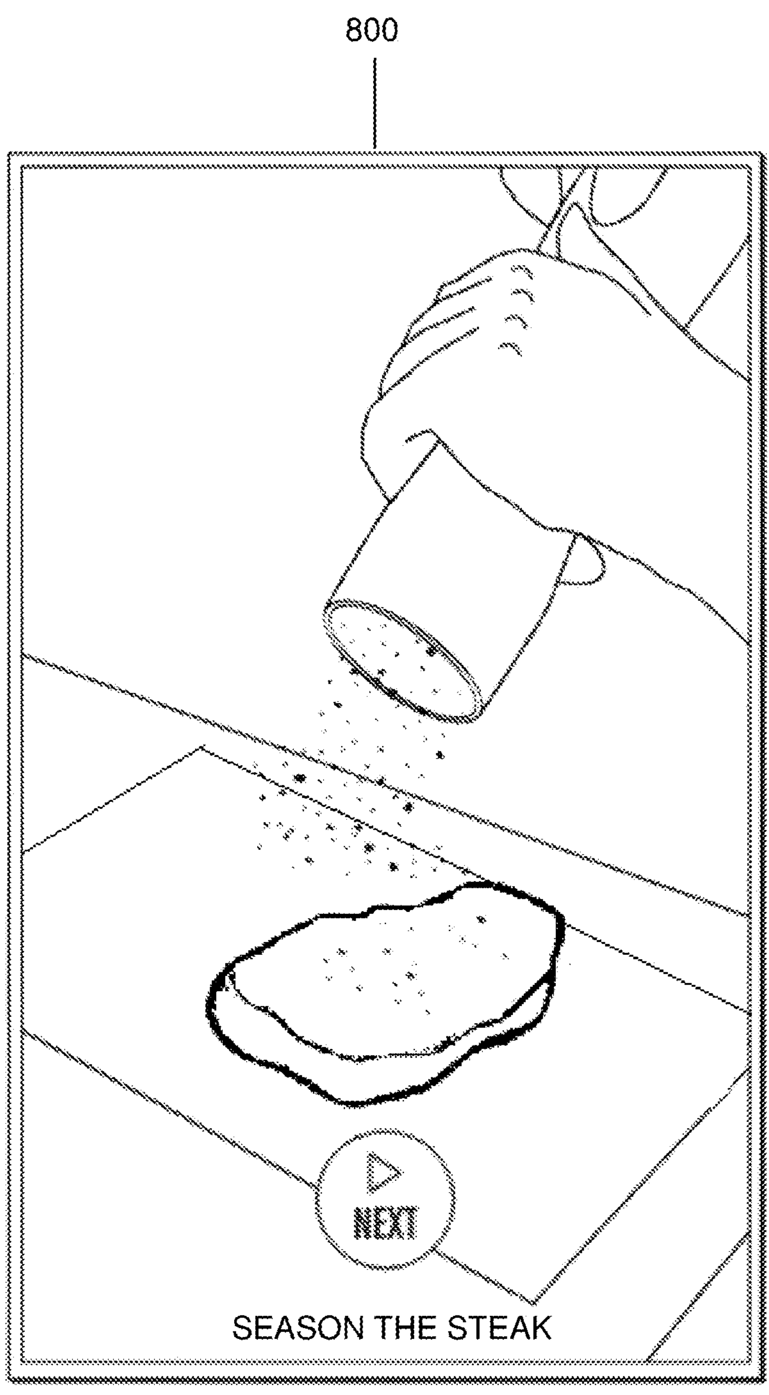
FIG. 8 is a sample portion of the enhanced recipe of FIG. 6, which includes media content depicting actions to be performed during a particular recipe stage of the enhanced recipe.

Once each stage is modified (or not modified as the case may be) and the analysis is complete, the system 100 may reformat the digital recipe into a digital file including a machine instruction set for cooking stages (e.g., those involving a temperature profile) and/or other desired stages, which may then be utilized by the various devices in the system 100 to facilitate in the preparation and/or cooking of the ingredients utilized to prepare the food item 130 (e.g., to activate the devices, keep the heat sources 121 at a set temperature for a set duration, deactivate the devices, obtain measurement information from the sensors 175*a-d*, etc.). The enhanced recipe 600, as shown in FIGS. 6-8, included in the digital file may be displayed on the user interface 105 of the first user device 102 via the interactive electronic cookbook 106, which may save the enhanced recipe 600. Illustratively, the original recipe 400 may be converted into enhanced recipe 600, which may include further instructions and temperature and time instructions based on the enhancements, as is shown in FIG. 6. Enhancements are shown in bold and underlines in enhanced recipe 600. For example, step 1 was modified to indicate that the skillet should be placed on the stovetop and heated to 450 degrees. As another example, steps 4 and 5 were modified to indicate that the user should sear the steak for 30 seconds (e.g., to achieve the browning suggested in the original recipe 400). In addition to performing textual description enhancements as shown in FIG. 6, the system 100 may also have incorporated other enhancements, such as is shown in FIGS. 7-8. In FIG. 7, additional recipe content 700 may be displayed to the first user 101, which may include images of the steak and ingredients utilized in preparing the steak to assist the first user 101 with the cooking process. The additional recipe content 700 may be integrated directly into enhanced recipe 600 and/or separately accessible via an option in the enhanced recipe 600. In FIG. 8, further recipe content 800 in the form of an instructional video for salting and seasoning the steak is made available to the first user 101 based on the enhancements made by the system 100. Notably, the system 100 may incorporate any of the functionality described for method 900 and/or other functionality described in the present disclosure.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, obtaining digital recipes including digital content; parsing the recipes for keywords to identify one or more recipe stages of the recipes; identifying cooking ingredients in each recipe stage; identifying which recipe stages correspond to cooking stages; identifying key ingredients in each cooking stage that are critical in controlling the cooking time; determining the cooking temperature in each cooking stage based on rules; determining the cooking time of the key ingredient based on characteristics of the key ingredient, based on device conditions, and based on other factors; generating questions for a user to improve determinations of cooking times, temperatures, and food manipulations; enhancing recipes with content; substituting recipe stages with higher quality recipe stages; reformatting digital recipes into digital files that include machine instruction sets for cooking stages; providing the digital files including the machine instruction sets for the cooking stages to cooking devices 170 and/or other devices to facilitate the performance of one or more cooking stages and/or recipe stages; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-3 illustrates specific example configurations of the various components of the system 100, the system 100 may include any configuration of the components, which may include using a greater or lesser number of the components. For example, the system 100 is illustratively shown as including a first user device 102, a second user device 111, a heating system 120, a heat source 121, a food item 130, a communications network 135, a server 140, a server 150, a server 160, a database 155, a cooking device system 168, a cooking device 170, a natural language processing engine 180, and a learning engine 185. However, the system 100 may include multiple first user devices 102, multiple second user devices 111, multiple heat source systems 120, multiple heat sources 121, multiple food items 130, multiple communications networks 135, multiple servers 140, multiple servers 150, multiple servers 160, multiple databases 155, multiple cooking device systems 168, multiple cooking devices 170, multiple natural language processing engines 180, multiple learning engines 185, or any number of any of the other components inside or outside the system 100. Similarly, the system 100 may include any number or amount of interactive electronic cookbooks 106, cooking instructions/machine instruction sets 124, measurement information 125, sensors 175*a-d*, recipes 400, enhanced and/or converted recipes 600, any other component, program, or device of the system 100, or any combination thereof. In certain embodiments, substantial portions of the functionality and operations of the system 100 may be performed by other networks and systems that may be connected to system 100.

Figure 9:
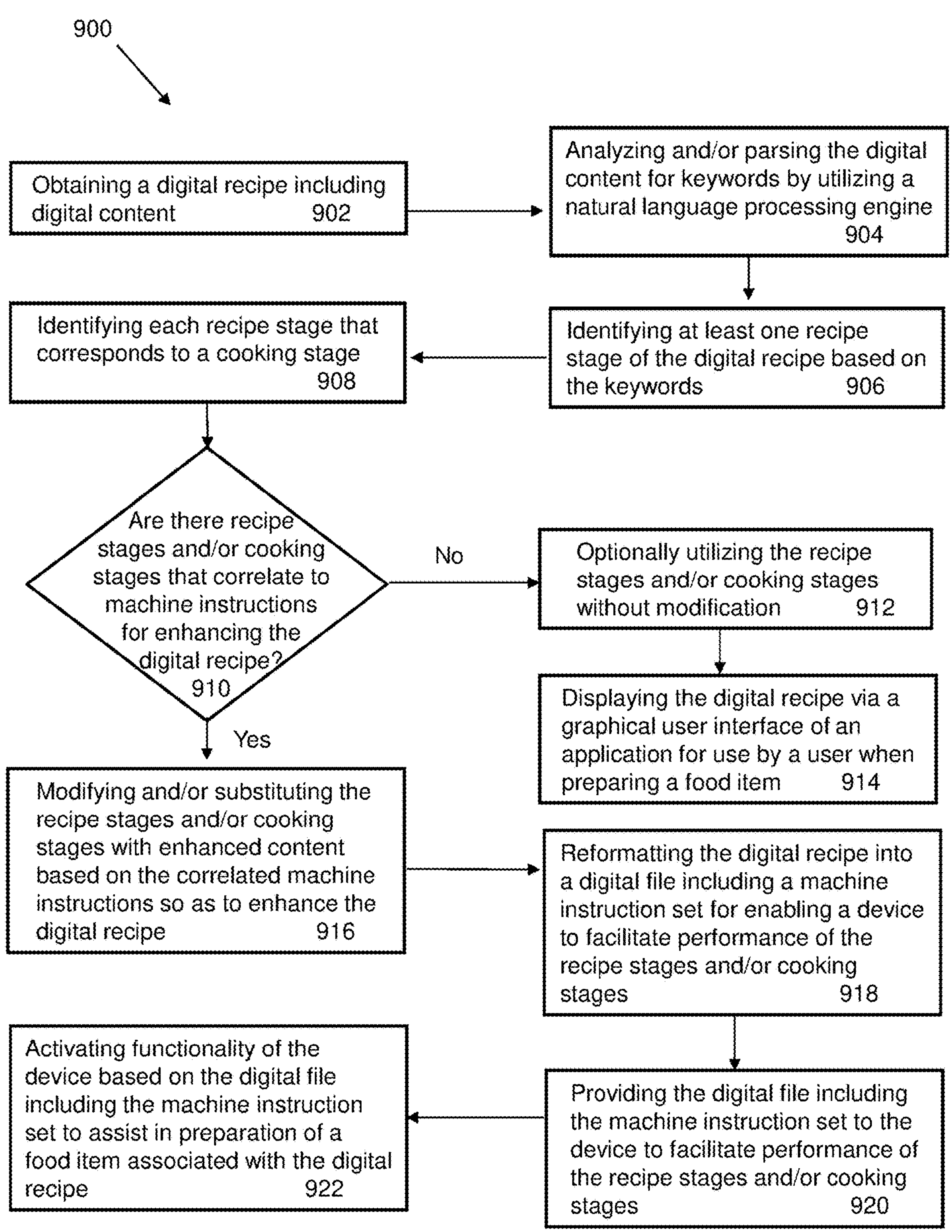
FIG. 9 is a flow diagram illustrating a sample method for performing recipe conversion according to an embodiment of the present disclosure.

As shown in FIG. 9, an exemplary method 900 for performing recipe conversion is schematically illustrated. For the purposes of method 900, a user, such as first user 101, or a device, such as first user device 102 (or even cooking device 170 or heating system 120), may desire to cook a food item 130 based on a recipe, such as a recipe for preparing fish on a skillet. At step 902, the method 900 may include obtaining a digital recipe. For example, the recipe may be obtained by scanning a printed recipe using a scanner and uploading the scanned recipe into the first user device 102, the recipe may be obtained by inputting the recipe into the interactive electronic cookbook 106, the recipe may be obtained by accessing the recipe via a URL by utilizing a web browser program, and/or the recipe may be obtained by any other suitable means. In certain embodiments, if the recipe is a printed recipe that is scanned into the system 100, one or more optical character recognition techniques may be applied to the scanned recipe so that the text from the recipe may be obtained. In certain embodiments, the obtaining of the recipe may be performed by utilizing the first user device 102, the second user device 111, the interactive electronic cookbook 106, the server 140, the server 150, the server 160, the communications network 135, any combination thereof, or by utilizing any other appropriate program, network, system, or device. At step 904, the method 900 may include parsing and/or analyzing text and/or other content from the digital recipe for keywords and/or terms, such as by utilizing the natural language processing engine 180. For example, some of the keywords and/or terms parsed from the recipe for fish may be the terms "season", "salt" "tuna steak", "skillet", "olive oil", "melt", "until", "butter", "pepper", "sear", "after", "remove" and "serve". In certain embodiments, the parsing and/or analyzing may be facilitated and/or performed by utilizing the first user device 102, the second user device 111, the interactive electronic cookbook 106, the server 140, the server 150, the server 160, the communications network 135, the natural language processing engine 180, the learning engine 185, any combination thereof, or by utilizing any other appropriate program, network, system, or device.

Once the keywords and/or terms are identified based on the parsing and/or analyzing, the method 900 may include identifying one or more recipe stages of the digital recipe based on the identified keywords and/or terms, at step 906. For example, the natural language processing engine 180 may determine that the term "season" corresponds with a recipe stage for seasoning the tuna steak. The natural language processing engine 180 may determine this by comparing the parsed term "season" with entries in the database 155. If there is a match with an entry in the database 155, an association may have been stored in the database 155 indicating that the term "season" is associated with a first recipe stage for the recipe. The natural language processing engine 180 may also determine that the term "melt" is associated with a second recipe stage for the recipe for preparing the tuna steak, that the term "sear" is associated with a third recipe stage for the recipe, that the term "remove" is associated with a fourth recipe stage for the recipe, and that the term "serve" is associated with a fifth and final recipe stage for the recipe. At step 906, the method 900 may also identify each ingredient in the digital recipe, along with key ingredients in each stage. Key ingredients may be ingredients that are critical to and control cooking time for a particular recipe stage and/or the recipe overall. In certain embodiments, the identifying of the recipe stages may be performed by utilizing the first user device 102, the second user device 111, the interactive electronic cookbook 106, the server 140, the server 150, the server 160, the communications network 135, the natural language processing engine 180, the learning engine 185, any combination thereof, or by utilizing any other appropriate program, network, system, or device.

At step 908, the method 900 may include identifying each recipe stage that corresponds to a cooking stage. For example, based on the parsed keywords and/or terms, the natural language processing engine 180 may determine that the recipe stage associated with the term "melt" is a cooking stage, and the recipe stage associated with the term "sear" is a cooking stage. The natural language processing engine 180 may determining that these recipe stages are cooking stages by comparing the terms to entries in the database 155, which may indicate that these terms signify cooking stages. The key ingredients for each cooking stage may also be determined by the natural language processing engine 180, along with cooking temperatures and cooking times for the ingredients. In certain embodiments, the identifying of the cooking stages may be performed by utilizing the first user device 102, the second user device 111, the interactive electronic cookbook 106, the server 140, the server 150, the server 160, the communications network 135, the natural language processing engine 180, the learning engine 185, any combination thereof, or by utilizing any other appropriate program, network, system, or device.

Once the cooking stages of the recipe stages are identified, the method 900 may proceed to step 910, which may include determining if the recipe stages and/or cooking stages correlate to machine instructions for controlling the devices in the system 100 and for enhancing and/or modifying the digital recipe. For example, the natural language processing engine 180 may determine that the recipe stage for melting the butter may correlate to machine instructions stored in the database 155 for activating the cooking device 170 and the heating system 120, and causing the heat source 121 of the heating system 120 to heat to 400 degrees Fahrenheit for five minutes. As another example, the machine instructions may be more robust instructions than what were found in the original recipe. For example, if the original parsed text of the recipe merely stated "melt the butter in the skillet," the natural language processing engine 180 may determine that a more robust machine instruction for this recipe stage may be utilized, which provides additional instructional detail as follows: "melt the butter in the skillet at high-heat at 400 degrees Fahrenheit for 30 seconds." As another example, if the parsed content from the original digital recipe only comprises text, the natural language processing engine 180 may obtain images of solid butter, images of melted butter, a video of melting butter in a skillet, any other content associated with the preparation of the butter, or any combination thereof, from the database 155 based on the association of the term "melt" and "butter" with the images, videos and/or other content in the database 155. In certain embodiments, the determining as to whether the cooking stages and/or recipe states correlate to the machine instructions may be performed by utilizing the first user device 102, the second user device 111, the interactive electronic cookbook 106, the server 140, the server 150, the server 160, the communications network 135, the natural language processing engine 180, the learning engine 185, any combination thereof, or by utilizing any other appropriate program, network, system, or device.

If, at step 910, the recipe stages and/or cooking stages do not correlate to machine instructions, the method 900 may proceed to step to step 912. At step 912, the method 900 may include optionally utilizing the recipe stages and/or cooking stages without modifying the digital recipe parsed by the natural language processing engine 180. If the unmodified recipe is utilized, the method 900 may proceed to step 914, which may include displaying the digital recipe via a graphical user interface of an application when the user desires to prepare the food item 130. In such a scenario, the first user 101, for example, may simply view the unmodified and/or unenhanced recipe through the graphical user interface of the interactive electronic cookbook 106 by utilizing first user device 102. If, however, at step 910, the recipe stages and/or cooking stages do correlate to machine instructions, the method 900 may proceed to step 916. At step 916, the method 900 may include modifying and/or substituting each recipe stage and/or corresponding cooking stage with the machine instructions so as to enhance the digital recipe. In certain embodiments, in addition to or instead of modifying and/or substituting each recipe and/or cooking stage with machine instructions, the method 900 may include incorporating enhanced media content to each recipe stage and/or cooking stage so as to enhance the digital recipe. For example, for the recipe stage corresponding to melting butter in a cooking pan, the method 900 may include retrieving images of solid butter and melted butter in a cooking pan and incorporating such images into the recipe stage of the digital recipe. Additionally, the method 900 may include retrieving and incorporating video content, augmented reality content, virtual reality content, more detailed recipe instructions, any other content, or a combination thereof, into the digital recipe so as to enhance the digital recipe. In certain embodiments, the modifying, substituting, and/or enhancing may be performed by utilizing the first user device 102, the second user device 111, the interactive electronic cookbook 106, the server 140, the server 150, the server 160, the communications network 135, the natural language processing engine 180, the learning engine 185, any combination thereof, or by utilizing any other appropriate program, network, system, or device.

At step 918, the method 900 may include reformatting the digital recipe into a digital file including the machine instruction set and/or enhanced content to enable a device to facilitate performance of one or more of the recipe stages and/or corresponding cooking stages. For example, the digital recipe may be reformatted from a pdf file, text file, or other file into an executable file including instructions, which may be utilized to activate and/or deactivate the devices and/or programs in the system 100, such as, but not limited to, heating system 120, cooking device system 168, various features and functions of the interactive electronic cookbook 106, any other device or program of the system 100, or a combination thereof. In certain embodiments, the reformatting may be performed by utilizing the first user device 102, the second user device 111, the interactive electronic cookbook 106, the server 140, the server 150, the server 160, the communications network 135, the natural language processing engine 180, the learning engine 185, any combination thereof, or by utilizing any other appropriate program, network, system, or device. Once the digital recipe is reformatting into the digital file, the method 900 may include, at step 920, providing the digital file including the machine instructions set to the devices and/or programs in the system 100 to facilitate the performance of one or more recipe stages and/or corresponding cooking stages. At step 920, the method 900 may include executing the machine instructions from the digital file in order to activate and/or control the devices and/or programs in the system 100 according to the machine instructions. For example, the machine instructions may turn on the heating source 121 and activate the sensors 175*a-d* of the cooking device 170 in order to initiate the recipe stage corresponding to melting the butter prior to searing the tuna steak and to obtain measurements relating to temperature and/or other measurable conditions. Notably, the method 900 may further incorporate any of the features and functionality described for the system 100 or as otherwise described herein.

The systems and methods disclosed herein may include additional functionality and features. For example, the system 100 may generate step navigation functionality to enable the first and/or second user 101, 110 to step through each step of the enhanced recipe via the interactive electronic cookbook 106. In certain embodiments, a scroll tool may be provided in the graphical user interface of the interactive electronic cookbook 106 displaying the enhanced recipe or original recipe, along with icons that may be selected and/or manipulated to control one or more of the devices of the system 100 (e.g., heating system 120 and cooking device system 168). In certain embodiments, when an original recipe analyzed by the system 100 fails to identify the food size, thickness, and/or weight of the ingredients that are critical to heat transfer calculations, the system 100 may instruct the first and/or second user 101, 110 to weight or measure the ingredients and specify these values into the system 100 so that the system 100 may have the appropriate information to facilitate the creation of an enhanced recipe and/or to obtain the appropriate machine instructions to modify a recipe stage of the original recipe. In certain embodiments, the system 100, after replacing text in the original recipe with more precise and/or machine instructions (e.g., instructions in time and/or temperature profile that may be utilized by the devices in the system 100), the system 100 may display the original recipe side-by-side with the enhanced recipe with the revised text and content so that the first and/or second user 101, 110 may determine which version of the recipe that they want to proceed with. Once a selection is made, machine instructions corresponding to the selected version of the recipe may be ported and/or transmitted to the device of the system 100 to facilitate to the cooking and preparation process.

In certain embodiments, the system 100 may potentially verify the enhanced recipe and/or machine instructions by comparing it to a crowdsourced recipe that has been utilized by other users and devices in the past and/or comparative ratings of natural language drive analyses with the experience of actual users, which may be utilized to improve the rules utilized by the natural language processing engine 180 and/or the learning engine 185. In certain embodiments, the functionality provided by the system 100 may be performed entirely on the first and/or second user devices 102, 111, via a remote server, via any suitable device, via any suitable combination of devices, or a combination thereof. In certain embodiments, devices of the system 100 may be configured to not publish the enhanced recipes and/or content, unless an individual in control of the devices owned or had permission from the copyright holder of a recipe or a license agreement. In certain embodiments, if the first and/or second user 101, 110 wishes to publish and distribute the resulting enhanced recipes and/or content, the system 100 may detect copyrighted and/or copyrightable subject matter and remove it from the recipes and/or content prior to publishing, as well as providing attribution to the original recipe.

In certain embodiments, the system 100 may perform a substitution of a key ingredient in a recipe with a most similar key ingredient and preparation/cooking method existing in the database 155, and the corresponding instructions, which may include a temperature, time, and potentially a quantity of cooking oil, butter or fluid (water, wine, etc.). Such a substitution could include choices for how well done, and the entry of a precise thickness of the food, for example. In certain embodiments, the system 100 may provide a suggestion based on an interpolation from the data in the database 155, and offer the user a choice between one or two. In other words, the system 100 may give the option of choosing between cooking the same ingredient in an original recipe, using the system's 100 suggestion of temperature (and most likely time, or substitute an ingredient with the best fit). The substitution may involve simply a thickness of the meat, or an instruction to measure and input thickness. The system 100 may provide a suggestion based on an extrapolation from the data in the database 155, and offer the user a choice between the original, one or two with guidance as to how to prepare the food and what it should look like from the database 155 (i.e. images (still and/or video) text and audio). In certain embodiments, the system 100 may keep the key ingredient and annotate the recipe to add the suggested temperature setting for the key ingredient that is the best fit between what can be interpolated from the database 155 and the recipe (i.e. recipe say medium heat for 3-4 minutes, database 155 says 2.5 minutes at 385 Fahrenheit→instruction is 385 Fahrenheit for 2-3 minutes). In certain embodiments, the system 100 may keep the key ingredient and pick the temperature by any words that describe the method (sear vs. poach, the best practices for the food type in the cooking method (poaching may be at sub-boiling point of 190 Fahrenheit)), and then calculate the time based on heat transfer. This may be a combination of look up and heat transfer calculations. In certain embodiments, this may work in a sous vide recipe if the cooking device 170 is used with a thermal probe as a sous vide water bath or vapor cooking, and less likely cooking in an open fry pan.

The systems and methods disclosed herein may include still further functionality and features. For example, the operative functions of the system 100 and methods may be configured to execute on a special-purpose processor specifically configured to carry out the operations provided by the system 100 and methods. Notably, the operative features and functionality provided by the system 100 and methods may increase the efficiency of computing devices that are being utilized to facilitate the functionality provided by the system 100 and methods. For example, the system 100 and methods can optimize the performance of future actions conducted by the system 100 and methods through machine learning, such that a reduced amount of computer operations need to be performed by the devices in the system 100 using the processors and memories of the system 100 than in systems that are not capable of machine learning as described in this disclosure. In such a context, fewer processing resources and/or memory resources may need to be utilized because the processors and memories do not need to perform actions, operations, and analyses that have already been conducted by the system 100. For example, in a sample scenario, the natural language processing engine 180 may parse a particular digital recipe for cooking beef steak and determine that the term "medium well" is correlated with an existing machine instruction for cooking meat at a selected temperature profile such that the beef steak reaches a core temperature of 135 degrees Fahrenheit. Based on feedback received from the first user 101 that is entered into an input function of the interactive electronic cookbook 106, the first user 101 may specify that, based on his individual preference, the core temperature of 135 degrees Fahrenheit should be increased to 140 degrees Fahrenheit for recipes including the term "medium well" when it comes to preparing food items 130 the first user 101. As a result, on a subsequent occasion when the first user 101 wants to use a recipe for other types of meat, the system 100 may automatically associate the term "medium well" with 140 degrees Fahrenheit core temperature instead of the default 135 degrees Fahrenheit. By automatically propagating the feedback to some or all recipes that use the same or similar term, the system 100 may perform fewer processing operations when parsing and analyzing the same or similar term on future occasions. As a result, the functionality provided by the system 100 and methods may provide substantial savings in the usage of computer resources by utilizing the software and functionality provided in the present disclosure.

Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. Additionally, in certain embodiments, system 100 may operate continuously to reduce the possibility of errors from being introduced into the system 100. In certain embodiments, the system 100 and methods may also provide effective computing resource management by utilizing the features and functions described in the present disclosure. For example, in certain embodiments, the system 100 may specify a quantity of computer processor resources (e.g., processor clock cycles, processor speed, processor cache, etc.) that may be dedicated to parsing and analyzing digital recipes, identifying keywords from the parsed digital recipes, identifying the recipe stages in the digital recipes, determining if there are recipe stages and/or cooking stages that correlate to machine instructions for enhancing the digital recipes, modifying and/or substituting the recipe stages with enhanced content, reformatting the digital recipes into digital files, performing operations of the heating system 100, performing operations of the cooking device system 168, performing operations of the interactive electronic cookbook 106, and performing any other operations conducted by the system 100, or any combination thereof. For example, the system 100 may indicate a quantity of processor cycles of a processor that may be utilized to obtain data, process obtained data, and/or specify a selected amount of processing power that may be dedicated to parsing recipes based on processing loads experienced on the processors of the system 100.

In certain embodiments, any device or program in the system 100 may transmit a signal to a memory device (e.g., any of the memories in system 100) to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected and/or threshold value. For example, during time periods when usage of processing and/or memory resources is at or above a threshold level, the system 100 may reduce the amount of resources dedicated to parsing digital recipes. Similarly, during time periods when usage of processing and/or memory resources is below the threshold level, the system 100 may increase the amount of resources dedicated to parsing digital recipes. As another example, during periods of high processor and memory usage, the system 100 may automatically in real-time transmit a notification via the user interface of the interactive electronic cookbook 106 that video content will not be displayed with the recipe during such elevated processor and memory usage. During such time, only text or image content may be shown to the user, for example. In certain embodiments, the system 100 and methods may include transmitting signals to the memory devices utilized in the system 100, which indicate which specific portions (e.g., memory sectors, etc.) of the memory should be utilized to store any of the data utilized or generated by the system 100. Notably, the signals transmitted to the processors and memories may be utilized to optimize the usage of computing resources while executing the operations conducted by the system 100. As a result, such features provide substantial operational efficiencies and improvements over existing technologies.

In certain embodiments, the system 100 and methods may include equipping any one or more of the devices of the system 100, such as, but not limited to, the cooking device system 168, the heating system 120, and/or the first and second user devices 102, 111 with one or more graphics processors. The graphics processors may be configured to parallelize and speed up calculations and operations performed by the components of the system 100 so that the operations are performed in a more rapid fashion than with merely the existing processors (e.g., CPUs). For example, in certain embodiments, graphics processors may be utilized over traditional processors to process and analyze images and other content in digital recipes in order to increase the speed at which the system 100 operates. In certain embodiments, the operations of the learning engine 185 may be performed by utilizing a graphics processor, which may be configured to perform efficient and parallel computing and train the learning engine 185 using larger training data sets and in less time than CPUs. In certain embodiments, graphics processors may be utilized to perform feature detection so as to assist in identifying the identity of one or more ingredients in an image used for a recipe, to identify a degree of doneness when cooking a food item 130, to identify a texture of the food item 130, to identify a feel of the food item 130, to identify any discernible characteristic of food items and/or ingredients that may be of benefit in a recipe, or any combination thereof.

Figure 10:
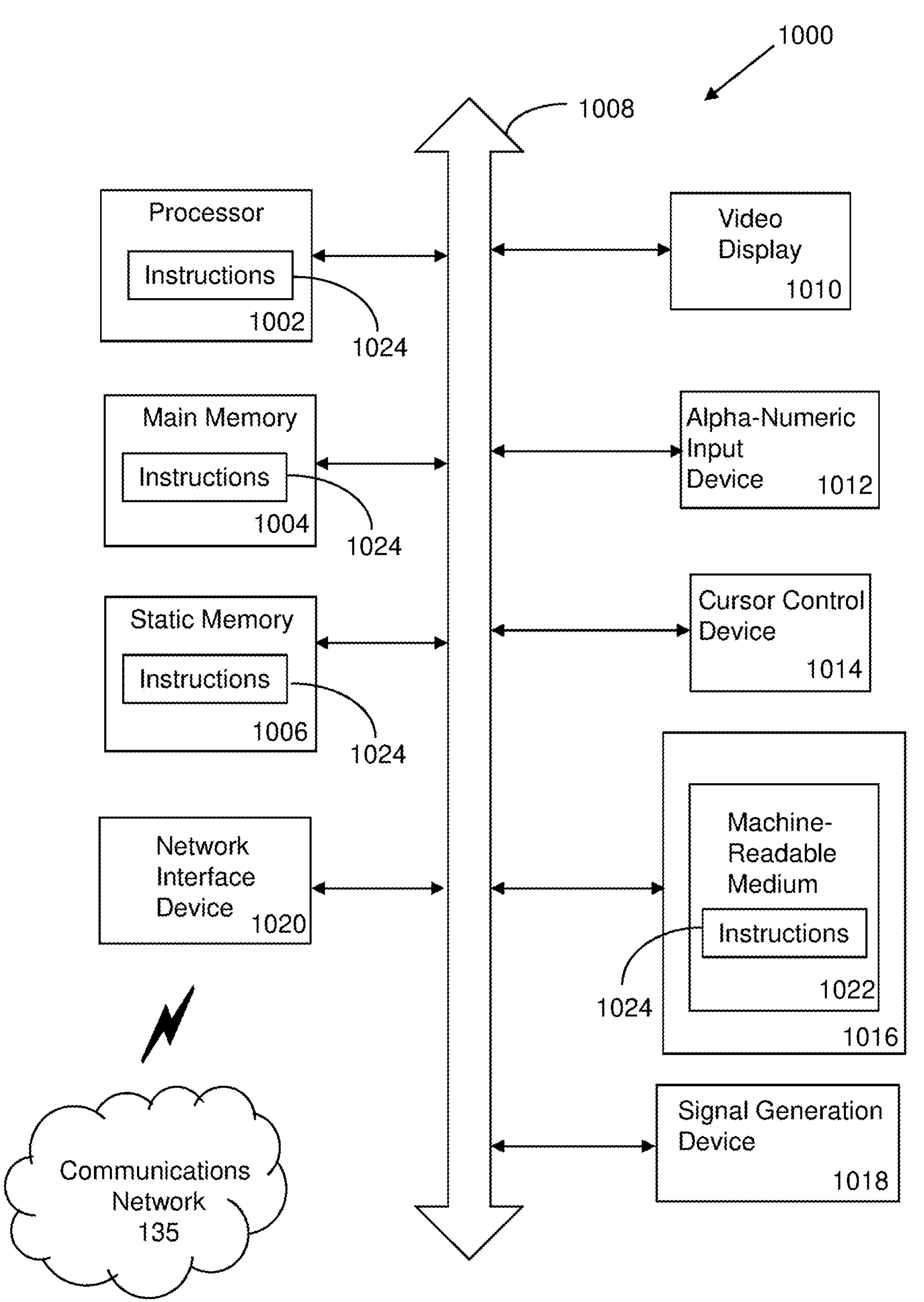
FIG. 10 is a schematic diagram of a machine in the form of a computer system within which a set of instructions, when executed, may cause the machine to perform any one or more of the methodologies or operations of the systems and methods for performing recipe conversion.

Referring now also to FIG. 10, at least a portion of the methodologies and techniques described with respect to the exemplary embodiments of the system 100 can incorporate a machine, such as, but not limited to, computer system 1000, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, subnetworks 135*a-c,* another network, or a combination thereof) to and assist with operations performed by other machines and systems, such as, but not limited to, the first user device 102, the second user device 111, the heating system 120, the heat source 121, cooking device system 168, the server 140, the server 150, the database 155, the server 160, the cooking device 170, or any combination thereof. The machine may assist with operations performed by any other component in the system, any functions of the system 100, any programs in the system 100, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010, which may be, but is not limited to, a liquid crystal display (LCD), a flat panel, a solid state display, or a cathode ray tube (CRT). The computer system 1000 may include an input device 1012, such as, but not limited to, a keyboard, a cursor control device 1014, such as, but not limited to, a mouse, a disk drive unit 1016, a signal generation device 1018, such as, but not limited to, a speaker or remote control, and a network interface device 1020.

The disk drive unit 1016 may include a machine-readable medium 1022 on which is stored one or more sets of instructions 1024, such as, but not limited to, software embodying any one or more of the methodologies or functions described herein, including those methods illustrated above. The instructions 1024 may also reside, completely or at least partially, within the main memory 1004, the static memory 1006, or within the processor 1002, or a combination thereof, during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1022 containing instructions 1024 so that a device connected to the communications network 135, subnetworks 135*a-c,* another network, or a combination thereof, can send or receive voice, video or data, and communicate over the communications network 135, subnetworks 135*a-c,* another network, or a combination thereof, using the instructions. The instructions 1024 may further be transmitted or received over the communications network 135, subnetworks 135*a-c,* another network, or a combination thereof, via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:

a memory that stores instructions; and a processor that executes the instructions to perform operations, the operations comprising:

obtaining a digital recipe including digital content, wherein the digital recipe is a recipe for preparing a food item;

identifying keywords associated with the digital content, wherein identifying the keywords comprises parsing, by utilizing a natural language processing engine, the digital content for one or more of the keywords;

identifying at least one recipe stage of the digital recipe based on the keywords;

identifying: (a) each recipe stage of the at least one recipe stage that corresponds to a cooking stage that utilizes heating or cooling to transform one or more ingredients, and (b) each recipe stage of the at least one recipe stage that corresponds to a non-cooking stage that does not utilize heating or cooling to transform one or more ingredients;

for each recipe stage that corresponds to the non-cooking stage, skipping over the respective recipe stage that corresponds to the non-cooking stage so that the respective recipe stage that corresponds to the non-cooking stage is not modified;

for each recipe stage that corresponds to the cooking stage:

identifying a key ingredient in the respective recipe stage that corresponds to the cooking stage, wherein the key ingredient is an ingredient having a critical effect on a cooking time for the cooking stage;

determining, based in part on the key ingredient, whether the respective recipe stage that corresponds to the cooking stage correlates to an existing machine instruction stored in the memory;

following a determination that the respective recipe stage that corresponds to the cooking stage does not correlate to any existing machine instruction stored in the memory, skipping over the respective recipe stage that corresponds to the cooking stage so that the respective recipe stage that corresponds to the cooking stage is not modified; and following a determination that the respective recipe stage that corresponds to the cooking stage does correlate to the existing machine instruction, substituting, via the existing machine instruction, the respective recipe stage that corresponds to the cooking stage with enhanced content so as to enhance the digital recipe; and reformatting the digital recipe into a digital file that includes (a) a machine instruction set for enabling a device to facilitate performance of one or more of the at least one recipe stage of the digital recipe, and (b) an enhanced recipe that includes each of (i) the enhanced content for each respective recipe stage that corresponds to the cooking stage and that correlates to the existing machine instruction, (ii) each unmodified recipe stage that corresponds to the cooking stage and does not correlate to any existing machine instruction stored in the memory, and (iii) each unmodified recipe stage that corresponds to the non-cooking stage.

2. The system of claim 1, wherein the operations further comprise generating the digital recipe by performing an optical character recognition technique on a scanned document.

3. The system of claim 1, wherein the operations further comprise determining a cooking temperature for each recipe stage that corresponds to the cooking stage, wherein the cooking temperature is determined based in part on rules based on the key ingredient.

4. The system of claim 3, wherein the operations further comprise determining a cooking time for the key ingredient based on ingredient size of the key ingredient, a weight of the key ingredient, a heat transfer parameter associated with the key ingredient, a heat capacity of the key ingredient, the cooking temperature, a device condition of a device utilized to cook the key ingredient, or a combination thereof.

5. The system of claim 1, wherein the operations further comprise presenting at least one question via a user interface of the system soliciting additional information associated with the digital recipe, the key ingredient, other ingredients, a device for cooking the food item, a food-preparation preference associated with preparing the food item, or a combination thereof.

6. The system of claim 5, wherein the operations further comprise receiving, via the user interface of the system, at least one input in response to the at least one question, wherein the operations further comprise determining that the existing machine instruction correlates with the at least one recipe stage that corresponds to the cooking stage based on the at least one input.

7. The system of claim 1, wherein the operations further comprise inserting step navigation functionality into a graphical user interface of an application supporting functionality of the system, wherein the step navigation functionality enables navigation among a plurality of recipe stages of the reformatted digital recipe when the user interacts with the step navigation functionality.

8. The system of claim 1, wherein the operations further comprise visually displaying the digital recipe and the reformatted digital recipe side-by-side on a graphical user interface of the system, and wherein the operations further comprise enabling selection of either the digital recipe or the reformatted digital recipe for use in preparing the food item.

9. The system of claim 8, wherein the operations further comprise transmitting, if the reformatted digital recipe is selected, the machine instruction set to the device to facilitate performance of the at least one recipe stage associated with preparing the food item.

10. The system of claim 1, wherein the operations further comprise determining a replacement key ingredient having a threshold level of similarity to the key ingredient, and wherein the operations further comprise enabling substitution of the key ingredient with the replacement key ingredient via a user interface of the system.

11. The system of claim 1, wherein identifying the keywords further comprises passing the parsed digital content through a series of semantic libraries to identify the one or more of the keywords.

12. The system of claim 11, wherein identifying the keywords further comprises comparing the one or more of the keywords to one or more databases to identify one or more additional keywords of the keywords.

13. The system of claim 12, wherein the one or more databases comprises one or more graph databases.

14. A method, comprising:

obtaining a digital recipe including digital content, wherein the digital recipe is a recipe for preparing a food item;

identifying keywords associated with the digital content, wherein identifying the keywords comprises parsing, by utilizing a natural language processing engine, the digital content for one or more of the keywords;

identifying at least one recipe stage of the digital recipe based on the keywords;

identifying: (a) each recipe stage of the at least one recipe stage that corresponds to a cooking stage that utilizes heating or cooling to transform one or more ingredients, and (b) each recipe stage of the at least one recipe stage that corresponds to a non-cooking stage that does not utilize heating or cooling to transform one or more ingredients;

for each recipe stage that corresponds to the non-cooking stage, skipping over the respective recipe stage that corresponds to the non-cooking stage so that the respective recipe stage that corresponds to the non-cooking stage is not modified;

for each recipe stage that corresponds to the cooking stage:

identifying a key ingredient in the respective recipe stage that corresponds to the cooking stage, wherein the key ingredient is an ingredient having a critical effect on a cooking time for the cooking stage;

determining, based in part on the key ingredient, whether the respective recipe stage that corresponds to a cooking stage correlates to an existing machine instruction stored in the memory;

following a determination that the respective recipe stage that corresponds to the cooking stage does not correlate to any existing machine instruction stored in the memory, skipping over the respective recipe stage that corresponds to the cooking stage so that the respective recipe stage that corresponds to the cooking stage is not modified; and following a determination that the respective recipe stage that corresponds to the cooking stage does correlate to the existing machine instruction, modifying, by utilizing the existing machine instruction, the respective recipe stage that corresponds to the cooking stage with enhanced content so as to enhance the digital recipe; and reformatting the digital recipe into a digital file that includes (a) a machine instruction set for enabling a device to facilitate performance of one or more of the at least one recipe stage of the digital recipe, and (b) an enhanced recipe that includes each of (i) the enhanced content for each respective recipe stage that corresponds to the cooking stage and that correlates to the existing machine instruction, (ii) each unmodified recipe stage that corresponds to the cooking stage and does not correlate to any existing machine instruction stored in the memory, and (iii) each unmodified recipe stage that corresponds to the non-cooking stage.

15. The method of claim 14, wherein identifying the keywords further comprises passing the parsed digital content through a series of semantic libraries to identify the one or more of the keywords.

16. The method of claim 15, wherein identifying the keywords further comprises comparing the one or more of the keywords to one or more databases to identify one or more additional keywords of the keywords.

17. The method of claim 16, wherein the one or more databases comprises one or more graph databases.

18. A non-transitory computer-readable medium comprising instructions, which when loaded and executed by a processor, cause the processor to perform operations comprising:

obtaining a digital recipe including digital content, wherein the digital recipe is a recipe for preparing a food item;

identifying keywords associated with the digital content, wherein identifying the keywords comprises parsing, by utilizing a natural language processing engine, the digital content for one or more of the keywords;

identifying at least one recipe stage of the digital recipe based on the keywords;

identifying: (a) each recipe stage of the at least one recipe stage that corresponds to a cooking stage that utilizes heating or cooling to transform one or more ingredients, and (b) each recipe stage of the at least one recipe stage that corresponds to a non-cooking stage that does not utilize heating or cooling to transform one or more ingredients;

for each recipe stage that corresponds to the non-cooking stage, skipping over the respective recipe stage that corresponds to the non-cooking stage so that the respective recipe stage that corresponds to the non-cooking stage is not modified;

for each recipe stage that corresponds to the cooking stage:

identifying a key ingredient in the respective recipe stage that corresponds to the cooking stage, wherein the key ingredient is an ingredient having a critical effect on a cooking time for the cooking stage;

determining, based in part on the key ingredient, whether the respective recipe stage that corresponds to the cooking stage correlates to an existing machine instruction;

following a determination that the respective recipe stage that corresponds to the cooking stage does not correlate to any existing machine instruction, skipping over the respective recipe stage that corresponds to the cooking stage so that the respective recipe stage that corresponds to the cooking stage is not modified; and following a determination that the respective recipe stage that corresponds to the cooking stage does correlate to the existing machine instruction, enhancing, based on the existing machine instruction, the respective recipe stage that corresponds to the cooking stage with enhanced content; and reformatting the digital recipe into a digital file that includes (a) a machine instruction set for enabling a device to facilitate performance of one or more of the at least one recipe stage of the digital recipe, and (b) an enhanced recipe that includes each of (i) the enhanced content for each respective recipe stage that corresponds to the cooking stage and that correlates to the existing machine instruction, (ii) each unmodified recipe stage that corresponds to the cooking stage and does not correlate to any existing machine instruction stored in the memory, and (iii) each unmodified recipe stage that corresponds to the non-cooking stage.

19. The non-transitory computer-readable medium of claim 18, wherein identifying the keywords further comprises passing the parsed digital content through a series of semantic libraries to identify the one or more of the keywords.

20. The non-transitory computer-readable medium of claim 19, wherein identifying the keywords further comprises comparing the one or more of the keywords to one or more databases to identify one or more additional keywords of the keywords.

* * * * *